(12) United States Patent
Chidlovskii

(10) Patent No.: US 11,494,660 B2
(45) Date of Patent: Nov. 8, 2022

(54) LATENT CODE FOR UNSUPERVISED DOMAIN ADAPTATION

(71) Applicant: NAVER CORPORATION, Gyeonggi-do (KR)

(72) Inventor: Boris Chidlovskii, Meylan (FR)

(73) Assignee: NAVER CORPORATION, Gyeonggi-Do (KR)

( * ) Notice: Subject to any disclaimer, the term of this patent is extended or adjusted under 35 U.S.C. 154(b) by 379 days.

(21) Appl. No.: 16/860,727

(22) Filed: Apr. 28, 2020

(65) Prior Publication Data

US 2021/0019629 A1 Jan. 21, 2021

(30) Foreign Application Priority Data

Jul. 17, 2019 (EP) ..................................... 19305943

(51) Int. Cl.
*G06N 3/08* (2006.01)
*G06F 17/18* (2006.01)
(Continued)

(52) U.S. Cl.
CPC ............. *G06N 3/084* (2013.01); *G06F 17/18* (2013.01); *G06K 9/6267* (2013.01); *G06N 3/0454* (2013.01); *G06N 3/0472* (2013.01)

(58) Field of Classification Search
CPC .... G06N 3/084; G06N 3/0454; G06N 3/0472; G06N 3/08; G06N 20/00; G06N 3/04; G06N 3/088; G06N 20/10; G06N 3/0445; G06F 17/18; G06K 9/6267; G06K 9/627; G06K 9/6232; G06K 9/6268; G06K 9/6215; G06K 9/6257; G06K 9/6259; G06K 9/6269; G06V 10/764; G06V 10/82; G06V 2201/03; G06V 10/40; G06V 10/751;
(Continued)

(56) References Cited

U.S. PATENT DOCUMENTS 11,106,950 B2 * 8/2021 Kecskemethy ...... G06K 9/6269
11,153,575 B2 * 10/2021 Lee ........................ G06V 10/82
(Continued)

OTHER PUBLICATIONS

"Generative adversarial networks and adversarial methods in biomedical image analysis"; Wolterink, Jelmer M., arXiv: 1810.10352v1 [cs.CV] Oct. 24, 2018 (Year: 2018).*
(Continued)

*Primary Examiner* — Michael S Osinski

(57) ABSTRACT

A pre-trained source encoder generates a source encoder representation for each image of a labeled set of source images from a source domain. A target encoder generates a target encoder representation for each image of an unlabeled set of target images from a target domain. A generative adversarial network outputs a first prediction indicating whether each of the source encoder representations and each of the target encoder representations originate from the source domain or the target domain. The generative adversarial network outputs a second prediction of the latent code for each of the source encoder representations and each of the target encoder representations. The target encoder and the generative adversarial network are trained by repeatedly updating parameters of the target encoder and the generative adversarial network until one or more predetermined stopping conditions occur.

23 Claims, 11 Drawing Sheets

(51) Int. Cl.
    *G06K 9/62* (2022.01)
    *G06N 3/04* (2006.01)
(58) Field of Classification Search
    CPC .............. G06V 10/454; G06V 10/451; G06V
                     10/7715; G06T 2207/20081; G06T
                     2207/20084; H04N 19/117; H04N
                     19/176; H04N 19/172; H04N 19/182;
                                                 H04N 19/186
    See application file for complete search history.

(56) References Cited

U.S. PATENT DOCUMENTS

| | | | | |
|---|---|---|---|---|
| 11,297,341 | B2* | 4/2022 | Erfurt | H04N 19/17 |
| 2009/0141932 | A1* | 6/2009 | Jones | G06V 10/993 |
| | | | | 382/100 |
| 2011/0040711 | A1* | 2/2011 | Perronnin | G06K 9/6247 |
| | | | | 706/46 |
| 2012/0269267 | A1* | 10/2012 | Choi | H04N 19/59 |
| | | | | 375/E7.243 |
| 2017/0132512 | A1* | 5/2017 | Ioffe | G06K 9/6256 |
| 2018/0137119 | A1* | 5/2018 | Li | G06F 16/5866 |
| 2018/0249158 | A1* | 8/2018 | Huang | H04N 19/46 |
| 2019/0073588 | A1* | 3/2019 | Kawaguchi | G06K 9/6268 |
| 2020/0082508 | A1* | 3/2020 | Alletto | G06T 5/002 |
| 2020/0342252 | A1* | 10/2020 | Givental | G08B 29/186 |
| 2020/0342328 | A1* | 10/2020 | Revaud | G06N 3/0472 |
| 2021/0073396 | A1* | 3/2021 | Rice | H04L 9/0631 |
| 2021/0125004 | A1* | 4/2021 | Robert | G06V 20/40 |
| 2021/0172752 | A1* | 6/2021 | Zhang | G06N 3/0454 |
| 2021/0224573 | A1* | 7/2021 | Bousmalis | G06K 9/6232 |
| 2021/0295112 | A1* | 9/2021 | Irie | G06K 9/6277 |
| 2021/0334665 | A1* | 10/2021 | Wang | G06N 3/088 |
| 2021/0358127 | A1* | 11/2021 | Jagadeesh | G06K 9/6253 |
| 2022/0094928 | A1* | 3/2022 | Amirpour | H04N 19/136 |
| 2022/0108134 | A1* | 4/2022 | Marrero | G06K 9/6268 |
| 2022/0139062 | A1* | 5/2022 | Kudo | G06T 7/00 |
| | | | | 382/131 |

OTHER PUBLICATIONS

A. Chadha and Y. Andreopoulos. Improving adversarial discriminative domain adaptation. arXiv:1809.03625, 2018.

A. Krizhevsky, I. Sutskever, and G. Hinton. ImageNet classification with deep Convolutional Neural Networks. In Neural Information Processing Systems (NeurIPS), 2012.

A. Mittal, A. Raj, V. P. Namboodiri, and T. Tuytelaars. Unsupervised domain adaptation in the wild: Dealing with asymmetric label sets. CoRR, abs/1603.08105, 2016.

A. Spurr, E. Aksan, and O. Hilliges. Guiding InfoGAN with Semi-Supervision. arXiv:1707.04487 [cs], Jul. 2017.

B. Chidlovskii. Using Latent Codes for Class Imbalance Problem in Unsupervised Domain Adaptation. arXIV:1909.08962v1 . Sep. 17, 2019.

Frenay, B., and Verleysen, M. 2014. Classification in the presence of label noise: A survey. IEEE Transactions on Neural Networks and Learning Systems 25(5):845-869.

G. Csurka. Domain adaptation for visual applications: A comprehensive survey. CoRR, arXiv:1702.05374, 2017.

Ganin, Y.; Ustinova, E.; Ajakan, H.; Germain, P.; Larochelle, H.; Laviolette, F.; Marchand, M.; and Lempitsky, V. 2016. Domain-adversarial training of neural networks. Journal of Machine Learning Research.

J. Hoffman, E. Tzeng, T. Park, J. Zhu, P. Isola, K. Saenko, A. A. Efros, and T. Darrell. Cycada: Cycle-consistent adversarial domain adaptation. In Proceedings of the 35th International Conference on Machine Learning, ICML 2018, Stockholmsmassan, Stockholm, Sweden, Jul. 10-15, 2018, pp. 1994-2003, 2018.

J. Zhang, Z. Ding, W. Li, and P. Ogunbona. Importance Weighted Adversarial Nets for Partial Domain Adaptation. arXiv:1803.09210 [cs], Mar. 2018. arXiv: 1803.09210.

Jiang, L.; Zhou, Z.; Leung, T.; Li, L.-J.; and FeiFei, L. 2018. MentorNet: Learning Data-Driven Curriculum for Very Deep Neural Networks on Corrupted Labels. In Intern. Conference Machine Learning (ICML), 2309-2318.

K. Saenko, B. Kulis, M. Fritz, and T. Darrell. Adapting visual category models to new domains. In Proc. of ECCV, (Springer), pp. 213-226, 2010.

M. Long, H. Zhu, J. Wang, and M. I. Jordan. Unsupervised Domain Adaptation with Residual Transfer Networks. arXiv:1602.04433 [cs], Feb. 2016. arXiv: 1602.04433.

M. Mirza and S. Osindero. Conditional Generative Adversarial Nets. arXiv:1411.1784, Nov. 2014. arXiv: 1411.1784.

M. Wang and W. Deng. Deep visual domain adaptation: A survey. Neurocomputing CoRR, abs/1802.03601, 2018.

Miyato, T., and Koyama, M. 2018. cGANs with Projection Discriminator. CoRR abs/1802.05637.

OrtigosaHernandez, J.; Inza, I. n.; and Lozano, J. A. 2017. Measuring the class-imbalance extent of multi-class problems. Pattern Recognition Letters 98:32-38.

Q. Chen, Y. Liu, Z. Wang, I. Wassell, and K. Chetty. Re-Weighted Adversarial Adaptation Network for Unsupervised Domain Adaptation. In IEEE Conf. Computer Vision and Pattern Recognition (CVPR), 10 pages, Jun. 2018.

S. J. Pan and Q. Yang. A survey on transfer learning. Transactions on Knowledge and Data Engineering, 22(10):1345-1359, 2010.

Saito, K.; Yamamoto, S.; Ushiku, Y.; and Harada, T. 2018. Open set domain adaptation by backpropagation. In European Conference Computer Vision (ECCV), 153-168.

W.-C. Hung, Y.-H. Tsai, Y.-T. Liou, Y.-Y. Lin, and M.-H. Yang. Adversarial Learning for Semi-Supervised Semantic Segmentation. arXiv:1802.07934 [cs], Feb. 2018. arXiv: 1802.07934.

Wiedemann, S.; Marban, A.; M ' uller, K.; and Samek, W. 2018. Entropy-constrained training of deep neural networks. CoRR abs/1812.07520.

X. Chen, Y. Duan, R. Houthooft, J. Schulman, I. Sutskever, and P. Abbeel. InfoGAN: Interpretable Representation Learning by Information Maximizing Generative Adversarial Nets. arXiv:1606.03657 [cs, stat], Jun. 2016.

X. Peng, B. Usman, N. Kaushik, J. Hoffman, D. Wang, and K. Saenko. Visda: The visual domain adaptation challenge. arXiv:1710.06924, 2017.

Z. Cao, L. Ma, M. Long, and J. Wang. Partial adversarial domain adaptation. In Computer Vision—ECCV 2018—15th European Conference, Munich, Germany, Sep. 8-14, 2018, Proceedings, Part VIII, pp. 139-155, 2018.

A. Gretton et al., "A kernel two-sample test", *Journal of Machine Learning Research*, 13(1): 723-773,2012.

B. Sun et al., "Correlation Alignment for Unsupervised Domain Adaptation", arXiv: 1612.01939 [cs], Dec. 2016.

B. Zadrozny, "Learning and evaluating classifiers under sample selection bias", *Proceedings of ICML*, 2004.

E. Tzeng et al., "Adversarial discriminative domain adaptation", *Conference on Computer Vision and Pattern Recognition, CVPR*, pp. 2962-2971, 2017.

E. Tzeng et al., "Simultaneous deep transfer across domains and tasks", *Proceedings of ICCV*, (IEEE), pp. 4068-4076, 2015.

European Search Report for European Application No. EP 19 30 5943 dated Jan. 16, 2020.

H. Yan et al., "Mind the Class Weight Bias: Weighted Maximum Mean Discrepancy for Unsupervised Domain Adaptation", arXiv: 1705.00609, May 2017.

I. Goodfellow et al., "Generative adversarial nets", *Proceedings of NIPS*, (Curran Associates), 2014.

J. Yosinski et al., "How transferable are features in deep neural networks?", *NIPS 2014*.

L. Jiang et al, "MentorNet: Regularizing Very Deep Neural Networks on Corrupted Labels", arXiv:1712.05055, Dec. 2017.

M. Long et al., "Deep learning of transferable representation for scalable domain adaptation", *Transactions on Knowledge and Data Engineering*, 9(28), 2016.

M. Long et al., "Conditional Adversarial Domain Adaptation", *Proceedings Neural Information Processing Systems*, 2018.

(56) References Cited

OTHER PUBLICATIONS

M. Ren et al., "Learning to Reweight Examples for Robust Deep Learning", arXiv: 1803.09050, Mar. 2018.
Mehdi Mirza et al: "Conditional generative adversarial nets", arXiv:1411.1784v1 [cs.LG], Nov. 6, 2014 (Nov. 6, 2014), XP055501175, https://arxiv.org/abs/1411.1784v1.
N. Courty et al., "Optimal Transport for Domain Adaptation", *IEEE Transactions on Pattern Analysis and Machine Intelligence*, 39(9): 1853-1865, Sep. 2017.
P. Häusser et al, "Associative domain adaptation", *IEEE International Conference on Computer Vision, ICCV*, pp. 2784-2792, 2017.
Y. Ganin et al., "Domain adversarial training of neural networks", *Journal of Machine Learning Research*, 2016.
Y. Zou et al., "Unsupervised domain adaptation for semantic segmentation via class-balanced self-training", *The European Conference on Computer Vision (ECCV)*, Sep. 2018.
Z. Cao et al., Partial Transfer Learning with Selective Adversarial Networks, arXiv: 1707.07901, Jul. 2017.

\* cited by examiner

LATENT CODE FOR UNSUPERVISED DOMAIN ADAPTATION

CROSS-REFERENCE TO RELATED APPLICATIONS

This application claims the benefit of European Application No. EP 19305943.3, filed on Jul. 17, 2019. The entire disclosure of the application referenced above is incorporated herein by reference.

FIELD

The present disclosure relates to image classification for computer vision applications. In particular, the present disclosure relates to classifying images using an improved unsupervised domain adaptation technique.

BACKGROUND

The development of deep neural networks including deep convolutional neural networks (CNN) has boosted a large number of computer vision applications. Significant advances that deep neural networks have achieved in various computer vision applications are to a large extent due to the availability of large-scaled labeled data. However, the manual annotation of large amounts of training data for various applications remains expensive. Further, neural networks trained on one set of images do not generalize well to novel sets of images and tasks. This is due to domain shift, the differences between the data distributions of the two domains from which the sets of images are sampled. For example, a neural network trained on synthetic images of objects will not generalize well to photographs of the objects in the real world that include different backgrounds as well as light and shadow. Accordingly, the aim of domain adaptation is to generalize the learned knowledge from a labeled source domain to a new unlabeled domain, called the target domain.

Unsupervised domain adaptation (UDA) aims at compensating the data shift between different domains by learning domain-invariant feature representations using labeled data of the source domain and unlabeled data of the target domain. Deep networks contribute to UDA by disentangling explanatory factors of variations underlying domains to learn more transferable features. Features are transferable (or domain invariant) if they are designed in such a way they can be used in both source and target domains without an accuracy drop.

More specifically, labeled source images $X_s$ having labels $Y_s$ are drawn from a source domain distribution $p_s(x,y)$ and unlabeled target images $X_t$ are drawn from a target domain distribution $p_t(x)$. Due to the domain shift, the data distributions of the source domain and the target domain are different, i.e. $p_s(x) \neq p_t(x)$. Moreover, the label space, $Y^s$, formed by source labels $Y_s$ is often different from the target label space, $Y^t$.

Some approaches rely on the comparison of marginal distributions between the source and target domains (i.e., where $p(x,y)$), the marginal distribution variables x, given as the probability distribution $p(x) = \Sigma_y p(x,y)$, and until recently, they implicitly assumed a good class alignment between the source and target domains, such that reducing distribution divergence makes the transfer between domains easier. In the class alignment case, the two spaces are identical, $Y^t = Y^s$, and the source and target class distributions are similar, $p_t(y) \approx p_s(y)$. Under such an assumption, different families of domain adaptation methods have been developed, by matching the statistic moments, by optimal transportation between the domains, or by relying on domain adversarial networks. However, such an alignment assumption is invalidated in real-world scenarios where source classes are often under-represented or simply absent in the target domain. This shift between the source domain and the target domain is referred to as a class imbalance problem.

Domain adaptation may be performed in various ways. One example includes trying to match statistic moments on domain distributions, i.e. maximum mean discrepancy (MMD) and its joint and conditional variants. As another example, one may align representations in source and target domains using optimal transportation or by associating source and target data in an embedding space. As yet another example, adversarial learning may be used. Borrowing the idea of Generative Adversarial Networks (GAN), these examples encourage samples from different domains to be non-discriminative with respect to domain labels.

Class imbalance occurs when each class does not make up an equal portion of the dataset. Class imbalance in domain adaptation may be addressed based on projecting source and target data into a subspace and selecting a set of source subspaces that are most relevant to the target domain.

In the moment based family of domain adaptation methods, a weighted MMD model may be used to introduce an auxiliary weight for each class in the source domain when the class weights in the target domain are not the same as those in the source domain. The class weights may be either known or estimated from iterative soft labeling of the target instances using the EM method.

In the adversarial learning family, partial domain adaptation relaxes the fully shared label space assumption to that the source label space subsumes the target label space. A Selective Adversarial Network (SAN) may be used in order to distinguish between the relevant and irrelevant (outlier) source classes.

Another strategy to identify the importance score of source samples involves two domain classifiers, where the activations of first domain classifier are used as an indicator of the importance of each source sample to the target domain. By using these activations as weights, the weighted source samples and target samples are fed into the second domain classifier for optimizing the feature extractor.

Selection bias may be addressed using semi-supervised learning and deep learning with noisy labels. Selection bias refers to the difference between the training and the test data. Specifically, selection bias causes the distribution of collected data used in training data to deviate from the overall distribution. Predictive models may be sensitive to selection bias, and this may be corrected by adding pseudo-labeled data to the training sample, while instance weighting may be used to make training samples similar to the distribution observed in the test data.

The iterative self-training procedure, where the problem is formulated as latent variable loss minimization, can be addressed by alternatively generating pseudo labels on target data and re-training the model with these labels. However, jointly learning the model and optimizing pseudo-labels on unlabeled data is naturally difficult as it is impossible to guarantee the correctness of the generated pseudo-labels. Semi-supervised learning can correct modest selection bias, but if the domain gap is too wide, initial predictions in the target domain may be poor, and there is a risk to increase bias during the training rather than decrease it.

Class imbalance (CI) may be measured as the Kullback-Leibler (KL) divergence of target class distribution $p_t(x)$ from the source class distribution $p_s(y)$. A KL divergence of 0 indicates similar behavior of two different distributions, while a KL divergence of 1 indicates that the two distributions behave in such a different manner that the expectation given the first distribution approaches zero.

FIG. 1 illustrates the impact of class imbalance on the performance of three domain adaptation methods: optimal transport, adversarial discriminative domain adaptation (ADDA), and correlation alignment (COREL). Specifically, FIG. 1 plots the classification accuracy as the function of CI values for the six domain adaptation tasks of the Office31 dataset (shown in FIG. 7). Large circles indicate the accuracy domain class alignment, where CI values lie between 0.03 and 0.08. Comparing the UDA methods for small CI values provides little information regarding their resistance to severe class imbalance. Meanwhile, when CI values approach 1, the accuracy drop is 30% to 50%.

Under a severe class imbalance, it may be difficult to reduce the domain shift by comparing source and target distributions directly. In other words, reducing distribution shift will not benefit the target task, since the marginal distributions between domains should not be the same.

In this case, transferring from the source domain to the target domain may be accomplished by re-weighting the source domain samples whose classes are likely to appear in the target domain. Since the target domain is unlabeled, it may be challenging to uncover which classes are presented and which source domain samples are important for transferring. Success of any re-weighting schema may rely on capacity to correctly estimate the target labels. While this may be relatively straightforward in the alignment case, this may be challenging in the case of severe class imbalance.

Two main approaches to cope with the class imbalance in domain adaptation are discussed above. The first approach is based on the source classifier. Methods count on the source classifier to correctly predict the soft target labels. However, if the gap between source and target is too large, iterative optimization with soft labels often suffer from estimation error, inadequate initialization and convergence to local minima.

The second approach is to count on the discriminator and its activations as an indicator for re-weighting the source instances. However, under class imbalance, it is challenging to distinguish between a poor domain discriminator and a low class probability in the target domain.

Accordingly, there is a need in the art to address the problem of severe class imbalance in unsupervised domain adaptation, when the class spaces in source and target domains diverge considerably.

It is therefore desirable to provide a method of improved image classification that overcomes the above disadvantages. Specifically, it is desirable to provide a method of training neural networks trained on labeled images from one domain to be able to accurately classify unlabeled images from another domain.

SUMMARY

The present disclosure provides for improved image classification by addressing the problem of severe class imbalance in unsupervised domain adaptation, when the class spaces in source and target domains diverge considerably. A new approach to class imbalance that uses latent codes in the adversarial domain adaptation setting is provided, where the latent codes can be used to disentangle the salient structure of the target domain and to identify under-represented classes. The latent code construction can be learned jointly with the learning of the domain invariant domain representation and used for accurately estimating the target labels. The new approach generalizes the absence of some classes in the target domain to the continuous space of divergences between class distributions.

In an example, a computer-implemented method of training a target encoder for classifying images into one of a plurality of categories using a classifier trained on images from a source domain, includes: generating, by a pre-trained source encoder, a source encoder representation for each image of a labeled set of source images from the source domain; generating by the target encoder, a target encoder representation for each image of an unlabeled set of target images from a target domain; inputting, into a generative adversarial network, the source encoder representations, the target encoder representations, and latent code representing the plurality of categories, where the generative adversarial network is configured to output a first prediction indicating whether each of the source encoder representations and each of the target encoder representations originate from the source domain or the target domain, and where the generative adversarial network is further configured to output a second prediction of the latent code for each of the source encoder representations and each of the target encoder representations; and training the target encoder and the generative adversarial network by repeatedly updating parameters of the target encoder and the generative adversarial network until a first loss function for the first prediction and a second loss function for the second prediction reach a minimum.

According to an aspect, the method further includes classifying a target image using the trained target encoder and the classifier, where the classifier is trained using supervised learning on the labeled set of source images. Classifying a target image using the trained target encoder and the classifier may include: inputting a target image into the trained target encoder; generating a target encoder representation of the target image; inputting the target encoder representation of the target image into the trained classifier; and classifying the image by the trained classifier into one of the plurality of categories.

According to another aspect, the method further includes pre-training the source encoder and the classifier by: inputting the source encoder representations and source labels into the classifier; and pre-training the source encoder and the classifier by repeatedly updating parameters of the source encoder and the classifier until the classification loss function reaches a minimum.

According to an aspect, the generative adversarial network includes a generator neural network, a discriminator neural network and an auxiliary neural network. The inputting, into the generative adversarial network, the source encoder representations, the target encoder representations, and the latent code, comprises inputting, into the generator neural network, the source encoder representations combined with the latent code and the target encoder representations combined with the latent code. The method includes computing, by the generator neural network, joint hidden representations for each of the source encoder representations and each of the target encoder representations, each joint hidden representation based on a combination of the latent code and a respective one of the source encoder representations and the target encoder representations; inputting, into the domain discriminator neural network, the joint hidden representations, where the domain discriminator neural network is configured to output the first prediction; and inputting, into the auxiliary neural network, the joint hidden representations, where the auxiliary neural network is configured to output the second prediction.

In a further example, a computer-readable storage medium having computer-executable instructions stored thereon is provided. When executed by one or more processors, the computer-executable instructions perform the method of training a target encoder described above.

In a further example, an apparatus comprising processing circuitry is provided. The processing circuitry is configured to perform the method of training a target encoder described above.

In a feature, a computer-implemented method of training a target encoder for classifying images into one of a plurality of categories using a classifier trained on images from a source domain is described. The method includes: generating, by a pre-trained source encoder, a source encoder representation for each image of a labeled set of source images from the source domain; generating by the target encoder, a target encoder representation for each image of an unlabeled set of target images from a target domain; inputting, into a generative adversarial network, the source encoder representations, the target encoder representations, and latent code representing the plurality of categories; by the generative adversarial network, outputting a first prediction indicating whether each of the source encoder representations and each of the target encoder representations originate from the source domain or the target domain; by the generative adversarial network, outputting a second prediction of the latent code for each of the source encoder representations and each of the target encoder representations; and training the target encoder and the generative adversarial network by repeatedly updating parameters of the target encoder and the generative adversarial network until one or more predetermined stopping conditions occur, such as until a first loss function for the first prediction reaches a minimum value and a second loss function for the second prediction reaches a minimum value.

In further features, the method further includes: classifying a target image using the trained target encoder and the classifier, wherein the classifier is trained using supervised learning on the labeled set of source images.

In further features, classifying a target image using the trained target encoder and the classifier, comprises: inputting a target image into the trained target encoder; generating a target encoder representation of the target image; inputting the target encoder representation of the target image into the trained classifier; and classifying the target image by the trained classifier into one of the plurality of categories.

In further features, the method further includes pre-training the source encoder and the classifier by: inputting the source encoder representations and source labels into the classifier; and pre-training the source encoder and the classifier by repeatedly updating parameters of the source encoder and the classifier one or more predetermined stopping conditions occur, such as until a classification loss function reaches a minimum value.

In further features, the parameters of the pre-trained source encoder are not fixed after the pre-training, and the method further includes training the pre-trained source encoder jointly with the target encoder and the generative adversarial network by repeatedly updating parameters of the source encoder, the target encoder, and the generative adversarial network (A) one or more predetermined stopping conditions occur, such as until the classification loss function, the first loss function, and the second loss function reach the minimum values.

In further features, the parameters of the pre-trained source encoder are fixed after the pre-training.

In further features, the parameters of the pre-trained source encoder are fixed after the pre-training.

In further features, the parameters of the target encoder are initialized using parameters of the pre-trained source encoder.

In further features, the generative adversarial network comprises a generator neural network, a discriminator neural network, and an auxiliary neural network, and the inputting, into the generative adversarial network, the source encoder representations, the target encoder representations, and the latent code comprises inputting, into the generator neural network, the source encoder representations combined with the latent code and the target encoder representations combined with the latent code.

In further features the method further includes: computing, by the generator neural network, joint hidden representations for each of the source encoder representations and each of the target encoder representations, each joint hidden representation based on a combination of the latent code and a respective one of the source encoder representations and the target encoder representations; inputting, into the domain discriminator neural network, the joint hidden representations, wherein the domain discriminator neural network is configured to output the first prediction; and inputting, into the auxiliary neural network, the joint hidden representations, wherein the auxiliary neural network is configured to output the second prediction.

In further features, outputting, by the auxiliary neural network, the second prediction of the latent code for each of the joint hidden representations comprises outputting a probability distribution for the latent code given the respective joint representation.

In further features, the auxiliary neural network includes a convolutional neural network comprising a final fully connected layer and a softmax function to output parameters for the probability distribution.

In further features, the generator neural network includes a convolutional neural network comprising three hidden layers with rectified linear unit (ReLu) activation.

In further features, the domain discriminator neural network includes a convolutional neural network comprising at least one fully connected layer.

In a feature, a computer-readable storage medium having computer-executable instructions stored thereon, which, when executed by one or more processors perform a method of training a target encoder for classifying images into one of a plurality of categories using a classifier trained on images from a source domain is described. The method includes: generating, by a pre-trained source encoder, a source encoder representation for each image of a labeled set of source images from the source domain; generating, by the target encoder, a target encoder representation for each image of an unlabeled set of target images from a target domain; inputting, into a generative adversarial network, the source encoder representations, the target encoder representations, and latent code representing the plurality of categories, where the generative adversarial network is configured to: output a first prediction indicating whether each of the source encoder representations and each of the target encoder representations originate from the source domain or the target domain; and output a second prediction of the latent code for each of the source encoder representations and each of the target encoder representations; and training the target encoder and the generative adversarial network by repeatedly updating parameters of the target encoder and the generative adversarial network until one or more predetermined stopping conditions occur, such as until a first loss function for the first prediction reaches a minimum value and a second loss function for the second prediction reaches a minimum value.

In a feature, a training system includes: a target encoder configured to classify images into one of a plurality of categories using a classifier; a pre-trained source encoder configured to generate a source encoder representation for each image of a labeled set of source images from the source domain, where the target encoder is configured to generate a target encoder representation for each image of an unlabeled set of target images from a target domain; a generative adversarial network configured to: receive the source encoder representations, the target encoder representations, and latent code representing the plurality of categories; output a first prediction indicating whether each of the source encoder representations and each of the target encoder representations originate from the source domain or the target domain; output a second prediction of the latent code for each of the source encoder representations and each of the target encoder representations; and one or more processors configured to train the target encoder and the generative adversarial network by repeatedly updating parameters of the target encoder and the generative adversarial network until one or more predetermined stopping conditions occur, such as until a first loss function for the first prediction reaches a minimum value and a second loss function for the second prediction reaches a minimum value.

In further features, the generative adversarial network comprises a generator neural network, a discriminator neural network, and an auxiliary neural network.

In further features: the generator neural network is configured to generate joint hidden representations for each of the source encoder representations and each of the target encoder representations, each joint hidden representation generated based on a combination of the latent code and a respective one of the source encoder representations and the target encoder representations; the domain discriminator neural network is configured to generate the first prediction based on the joint hidden representations; and the auxiliary neural network is configured to output the second prediction based on the joint hidden representations.

In further features, the auxiliary neural network is configured to output the second prediction including a probability distribution for the latent code given the respective joint representation.

In further features: the auxiliary neural network includes a convolutional neural network comprising a final fully connected layer and a softmax function to output parameters for the probability distribution; the generator neural network includes a convolutional neural network comprising three hidden layers with rectified linear unit (ReLu) activation; and the domain discriminator neural network includes a convolutional neural network comprising at least one fully connected layer.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The accompanying drawings are incorporated into and form a part of the specification for the purpose of explaining the principles of the examples. The drawings are not to be construed as limiting the example to only the illustrated and described example of how they can be made and used. Further features and advantages will become apparent from the following and more particularly from the description of the embodiments, as illustrated in the accompanying drawings.

DETAILED DESCRIPTION

Figure 1:
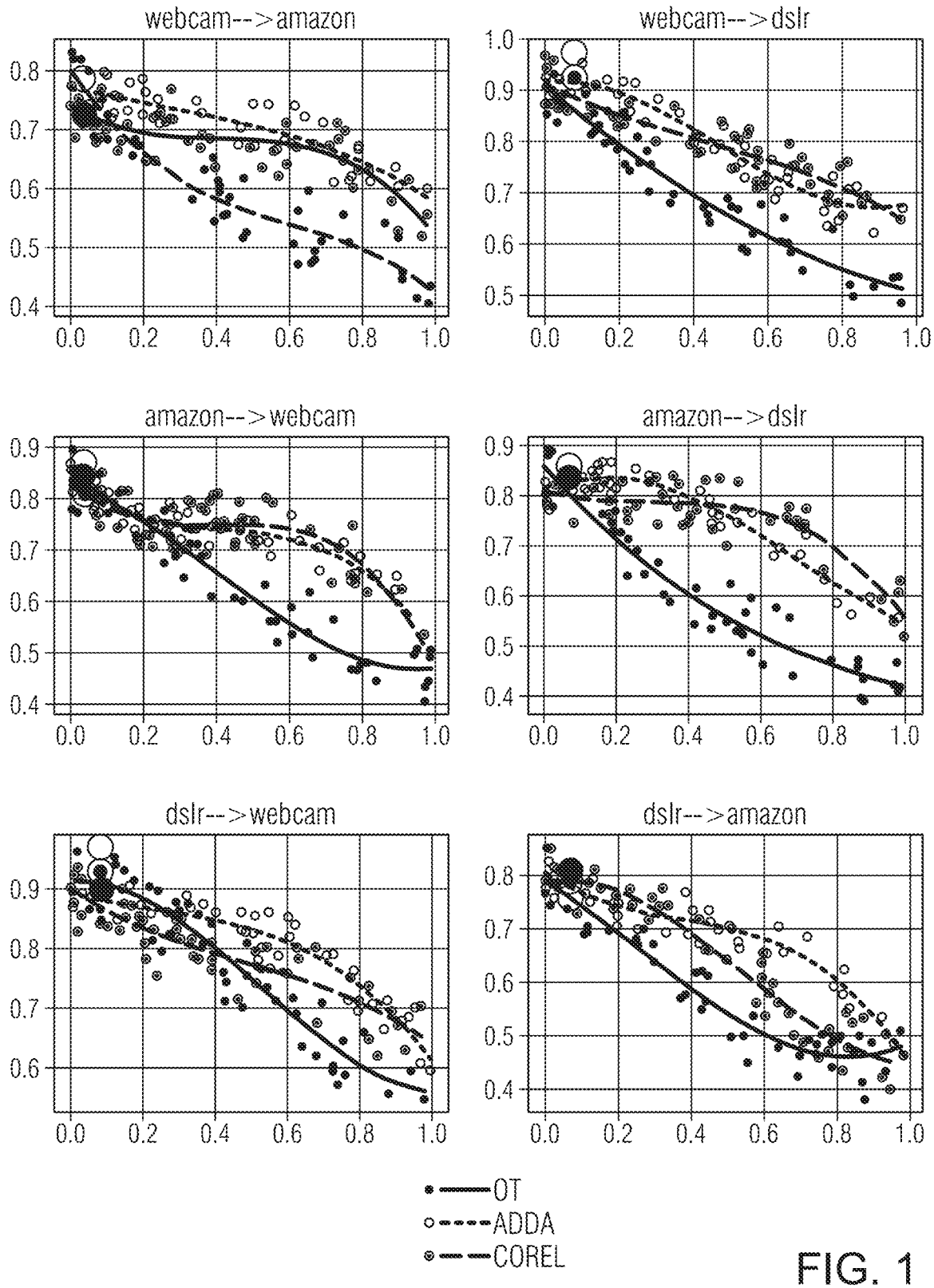
FIG. 1 is a plot of classification accuracy as a function of class imbalance, showing the impact of class imbalance on the performance of domain adaptation methods.

Described herein are systems and methods for image classification. For purposes of explanation, numerous examples and specific details are set forth in order to provide a thorough understanding of the described embodiments. Embodiments as defined by the claims may include some or all of the features in these examples alone or in combination with other features described below, and may further include modifications and equivalents of the features and concepts described herein. The illustrative embodiments will be described with reference to the drawings wherein like elements and structures are indicated by like reference numbers. Further, where an embodiment is a method, steps and elements of the method may be combinable in parallel or sequential execution and may be performed in a different order. As far as they are not contradictory, all embodiments described below can be combined with each other.

In the embodiments below, labeled source images $X_s$ having labels $Y_s$ are drawn from a source domain distribution $p_s(x,y)$ and unlabeled target images $X_t$ are drawn from a target domain distribution $p_t(x)$, where $p_s(x) \neq p_t(x)$. Moreover, the label space, $Y^s$, formed by source labels $Y_s$ is different from the target label space, $Y^t$, where $Y^t \subseteq Y^s$, and where the presence of some classes in the target domain is unknown. Consequently, attention is paid to the class imbalance when the target class distribution, $p_t(y)$, is different than the source class distribution, $p_s(y)$. Moreover, no difference is made between the under-represented and absent classes.

In adversarial domain adaptation (ADDA) a domain classifier is combined with domain representation learning to form an adversarial domain adaptation network. Both class discriminative and domain invariant representations are learned, where the loss of the label predictor of the source image is minimized while the loss of the domain classifier is maximized. The adversarial domain adaptation framework is similar to a GAN with the following minimax loss:

$$\min_{E_s, E_t} \max_D \mathcal{L} = \mathbb{E}_{x \sim p_s(x)}[\log D(E_s(x))] + \mathbb{E}_{x \sim p_t(x)}[\log(1 - D(E_t(x)))] \quad (1)$$

where $E_s$ is the source encoder, $E_t$ is the target encoder, and D is the domain classifier. D corresponds to the discriminator in the GAN, configured to discriminate between the source and the target domains, with all the source images labelled as 1 and all the target images labelled as 0. Maximizing the minimax loss with respect to D yields a tighter lower bound on the true domain distribution divergence, while minimizing the minimax loss with respect to $E_s$, $E_t$, minimizes the distribution divergence in the feature space.

Since no labeled images are available in the target domain, the network is trained in two stages. First, it learns the source encoding $E_s$, along with a source classifier, C. Then the network learns how to adapt that model to the target domain. A goal is to regularize the learning of the source and target encoders, $E_s$ and $E_t$, so as to minimize the distance between the source and target encoded distributions, $E_s(x)$ and $E_t(x)$.

Source and target encoders are configured to capture domain specific representations. In the first stage, the source discriminative model $C(E_s(x))$ is trained by one or more processors for the image classification task by learning the parameters of the source encoder, $E_s$, and the classifier, C, using a standard supervised loss for a source domain classification task.

Once the source encoder is learned and fixed, a domain adversarial loss is used to reduce the discrepancy between the two domains by optimizing the target encoder, $E_t$, and the discriminator, D. There are various different choices of adversarial loss functions, they all train the adversarial discriminator using the domain classification loss, $\mathcal{L}_{adv}^D$:

$$\min_{E_t} \max_D \mathcal{L}_{adv}^D = -\mathbb{E}_{x \sim p_s(x)}[\log D(E_s(x))] - \mathbb{E}_{x \sim p_t(x)}[\log(1 - D(E_t(x)))] \quad (2)$$

As more layers using activation functions are added to neural networks, the gradients of the loss function approaches zero, making the network hard to train (e.g., the vanishing gradient problem). To address the vanishing gradient problem, the domain classifier can be trained by one or more processors using the standard loss function with inverted labels. This splits optimization into two independent objectives, one for the encoder $E_t$ and one for the discriminator, D. $\mathcal{L}_{adv}^D$ remains unchanged, and $\mathcal{L}_{adv}^E$ is defined as follows:

$$\min_{E_t} \mathcal{L}_{adv}^E = -\mathbb{E}_{x_t \sim p_t(x)}[\log D(E_t(x_t))] \quad (3)$$

This loss function has the same properties as the minimax loss but provides stronger gradients to the target mapping. The stronger gradients allow the target encoder to better converge to the optimum. The source encoder $E_s$ trained by one or more processors at the first stage may be used as an initialization of the target encoder $E_t$.

The discriminative loss above works well when classes in domains are aligned, $p_s(y) \approx p_t(y)$. In the case of class imbalance, the direct sampling $x \sim p_s(x), x \sim p_t(x)$ in equations (2) to (3) is replaced with an instance re-weighting in weighted ADDA, that estimates the $p(x_s)/p(x_t)$ ratio, or by detecting outlier classes in partial domain adaptation, and downweighting their contribution to the loss.

Figure 2:
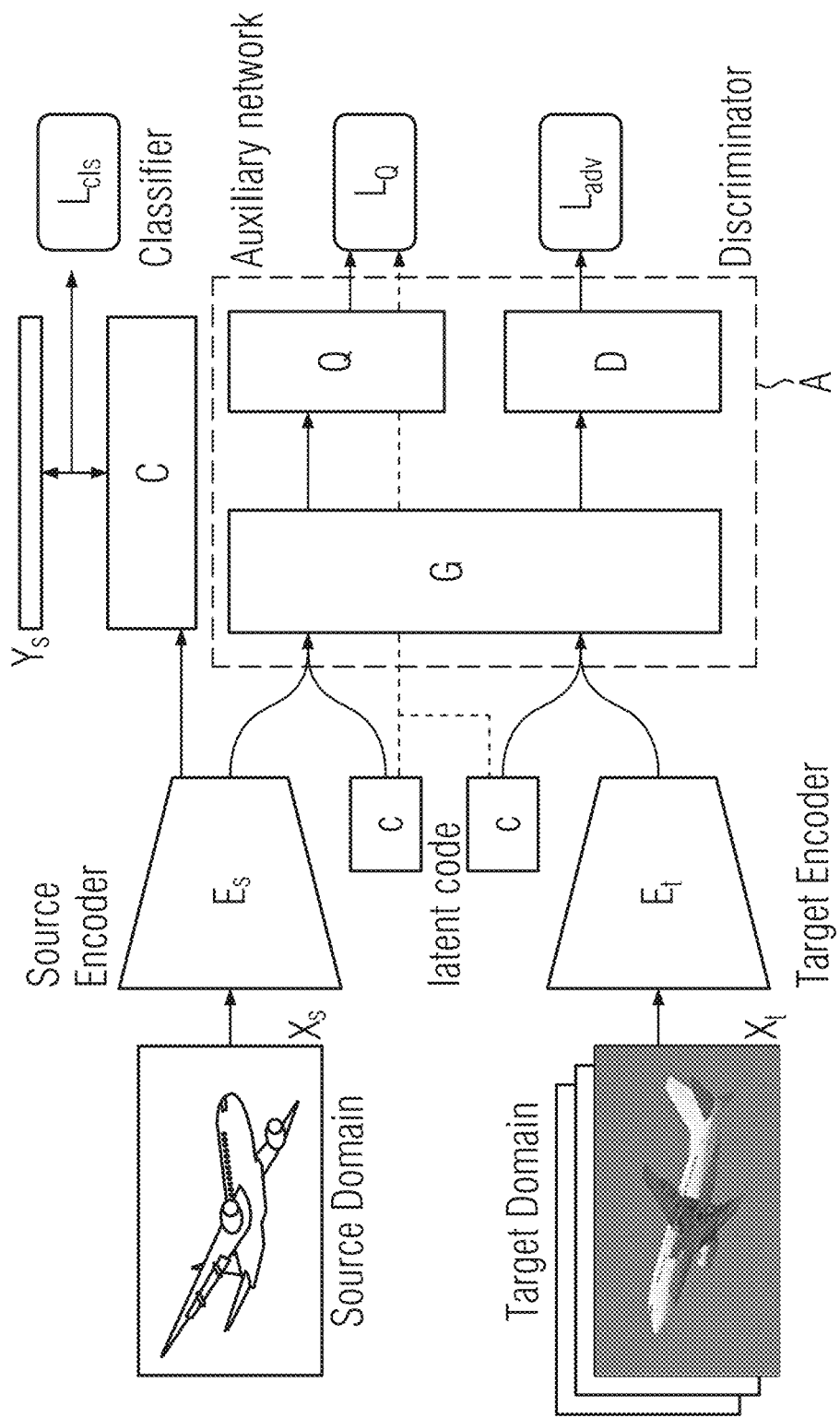
FIG. 2 illustrates a block diagram of a Latent code Adversarial Domain Adaptation (LADA) network in accordance with an example.

FIG. 2 illustrates a block diagram of a Latent code Adversarial Domain Adaptation (LADA) network in accordance with an embodiment. The LADA network comprises: a source encoder ($E_s$), a target encoder ($E_t$), a classifier (C), a latent code (c), and a generative adversarial network (A). In some embodiments, one or more of the components of the LADA network (the source encoder ($E_s$), the target encoder ($E_t$), the classifier (C) and the generative adversarial network (A)) are or include convolutional neural networks (CNNs).

The encoders (the source encoder ($E_s$) and the target encoder ($E_t$)) are each configured to map the source image to their respective encoder feature representation. Thus, the encoders are configured to generate and output a respective encoder representation of the input source image. The respective encoder representations are then output to the generative adversarial network (A) along with the latent code (c).

The generative adversarial network (A) comprises a generator neural network (G), a domain discriminator neural network (D), and an auxiliary neural network (Q). The source encoder representations and the target encoder representations are each combined with the latent code (c), where the generator neural network (G) is configured to receive, as input, the source encoder representations combined with the latent code (c) and the target encoder representations combined with the latent code (c). The encoder representations and the latent code (c) are concatenated, so that these inputs may be expressed generally as z=[E(x),c]. The generator neural network (G) is configured to generate joint hidden representations based on the input received from the source encoder ($E_s$) and the target encoder ($E_t$). The joint hidden representations are output, by the generator neural network (G), to the discriminator neural network (D) and the auxiliary neural network (Q). In some embodiments, the generator neural network is a convolutional neural network comprising three hidden layers with a ReLU (Rectified Linear Unit) activation function. The layer sizes may be 256, 128 and 64 neurons, respectively, or other suitable sizes.

The discriminator neural network (D) is configured to discriminate between the source domain and the target domain. In other words, the discriminator neural network is configured to predict whether each joint hidden representation received from the generator neural network (G) is associated with the source domain or the target domain. The latent code (c) enables disentangling of the salient structure of the target domain to boost discriminative learning of the target encoder ($E_t$) and the domain discriminator neural network (D).

Although the latent code (c) is represented by two separate blocks in FIG. 2, the same latent code is used as input in the source encoder and the target encoder in an embodiment. The latent code is a vector describing the specific features that are or should be in an image. For example, points, edges and objects are types of features that may be distinguished in an image. In an embodiment, the latent code (c) is sampled from a distribution P, which can be a pre-defined distribution or given from a data collection. In one embodiment, the latent code represents the plurality of categories, K, into which the images are to be classified. In this case, the latent code comprises a uniform categorical code with K categories.

The auxiliary network (Q) is included for the latent code reconstruction. Specifically, the auxiliary network (Q) is configured to predict, given each joint hidden representation, a probability distribution, Q(c|z), of the latent code (c). Moreover, the auxiliary network (Q) can complement the classifier (C) in estimating image labels.

In some embodiments, the auxiliary neural network (Q) and the domain discriminator neural network (D) share most convolutional layers, where the convolutional layers shared by the auxiliary neural network (Q) and the domain discriminator neural network (D) correspond to the convolutional layers of the generator neural network (G). Here, the output of the generator neural network (G) is mapped to fully connected layers for the discriminator and the auxiliary function with 2 and $N_c$ variables, respectively, where $N_c$ is the number of source classes. In some embodiments, the auxiliary neural network (Q) is one final fully connected layer with a softmax function to output parameters for the probability distribution Q(c|z).

The training and operation of the LADA network of FIG. 2 will be described in more detail below. More specifically, in the embodiments described below with regard to FIGS. 3 to 6, the LADA network is trained by one or more processors so that, after training, the target encoder ($E_t$) and the classifier (C) are configured to classify images into one of a plurality of categories.

Figure 3:
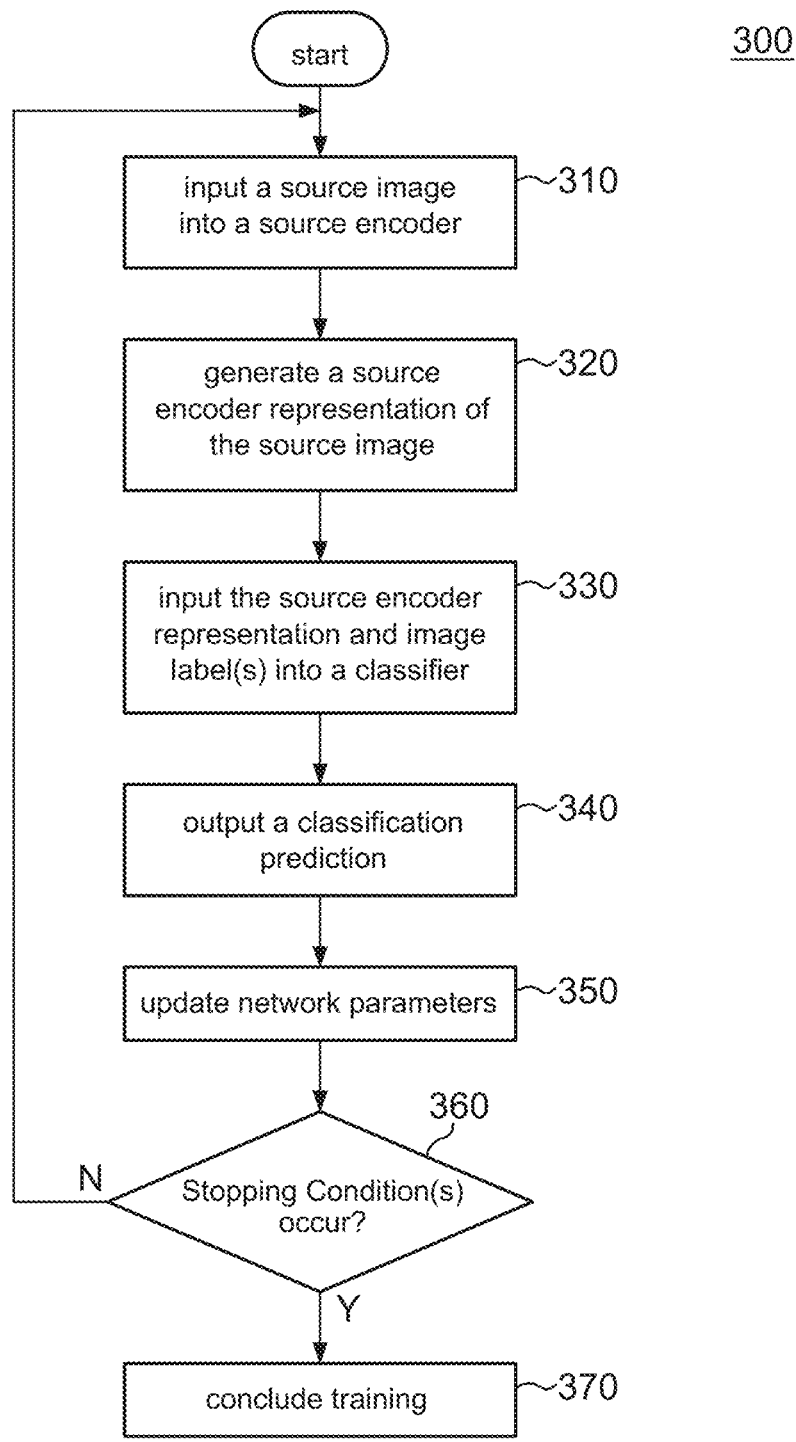
FIG. 3 illustrates a process flow diagram for a first stage of training the LADA network in accordance with an example.

FIG. 3 is a process flow diagram of an example method 300 of a first training stage for training the LADA network of FIG. 2 by one or more processors in accordance with an embodiment. The first training stage may also be referred to as a pre-training stage.

At 310, a source image is input into the source encoder ($E_s$). The source image is a first image of a labeled set of source images ($X_s$), having source labels ($Y_s$), from the source domain distribution ($p_s(x,y)$). The source encoder ($E_s$) generates a source encoder representation of the source image (320) based on the source image.

The classifier (C) is configured to receive the generated source encoder representations and source image labels ($Y_s$) as input. The source image labels may correspond to one or more categories of a plurality of categories for a corresponding image. In some embodiments, the source image labels correspond to objects shown in the corresponding images e.g. "chair", "table", "horse", "aeroplane," or another suitable label. At 330, the generated source encoder representation and the corresponding source label is input into the classifier (C).

The classifier (C) is configured to classify source images into one of a plurality of categories (K). Thus, at 340, the classifier (C) outputs, based on the source encoder representation and the source label input at 330, a prediction of the category of the source image. Since the source images are labeled (the source label), the classification objective function is a loss function ($\mathcal{L}_{cls}$) associated with the cost of incorrect category predictions. The parameters of the source encoder ($E_s$) and classifier (C) are learned, by training the source encoder ($E_s$) and the classifier (C) by one or more processors in a supervised fashion on the source image and label pairs (x,y) from the source domain distribution $p_s(x,y)$, using the following supervised loss function for the source domain classification task:

$$\min_{E_s, C} \mathcal{L}_{cls} = -\mathbb{E}_{x,y \sim p_s(x,y)} \sum_{k=1}^{K} 1_{k=y} \log C(E_s(x)) \quad (4)$$

At 350, the learnable parameters of the source encoder neural network ($E_s$) and the learnable parameters of the classifier (C) are updated by backpropagation of the relative gradients of the loss function with respect to the learnable parameters. The learnable parameters include the weights and, optionally, the biases of the neurons in the neural networks.

The source encoder ($E_s$) and the classifier (C) are trained by one or more processors by repeating 310 through 350 for each of the sources images in the set until it is determined at 360 that one or more predetermined stopping conditions have occurred (e.g., the classification loss function ($\mathcal{L}_{cls}$) has reached a minimum value (e.g., that $\mathcal{L}_{cls}$ is close to zero)). In other words, pre-training the source encoder ($E_s$) and the classifier (C) comprises minimizing the classification loss function ($\mathcal{L}_{cls}$). Once it is determined at 360 that the one or more predetermined stopping conditions have occurred (e.g., classification loss function ($\mathcal{L}_{cls}$) has been minimized), the first (pre-training) stage is concluded at 370. If the classification loss function has not yet been minimized at 360, a different source image is selected and control returns to 310 to continue the pre-training.

In an example, once the source encoder has been pre-trained during the first training stage, the parameters of the source encoder are fixed. In another embodiment, the parameters of the source encoder are not fixed after pre-training and are updated during the second training stage.

Figure 4:
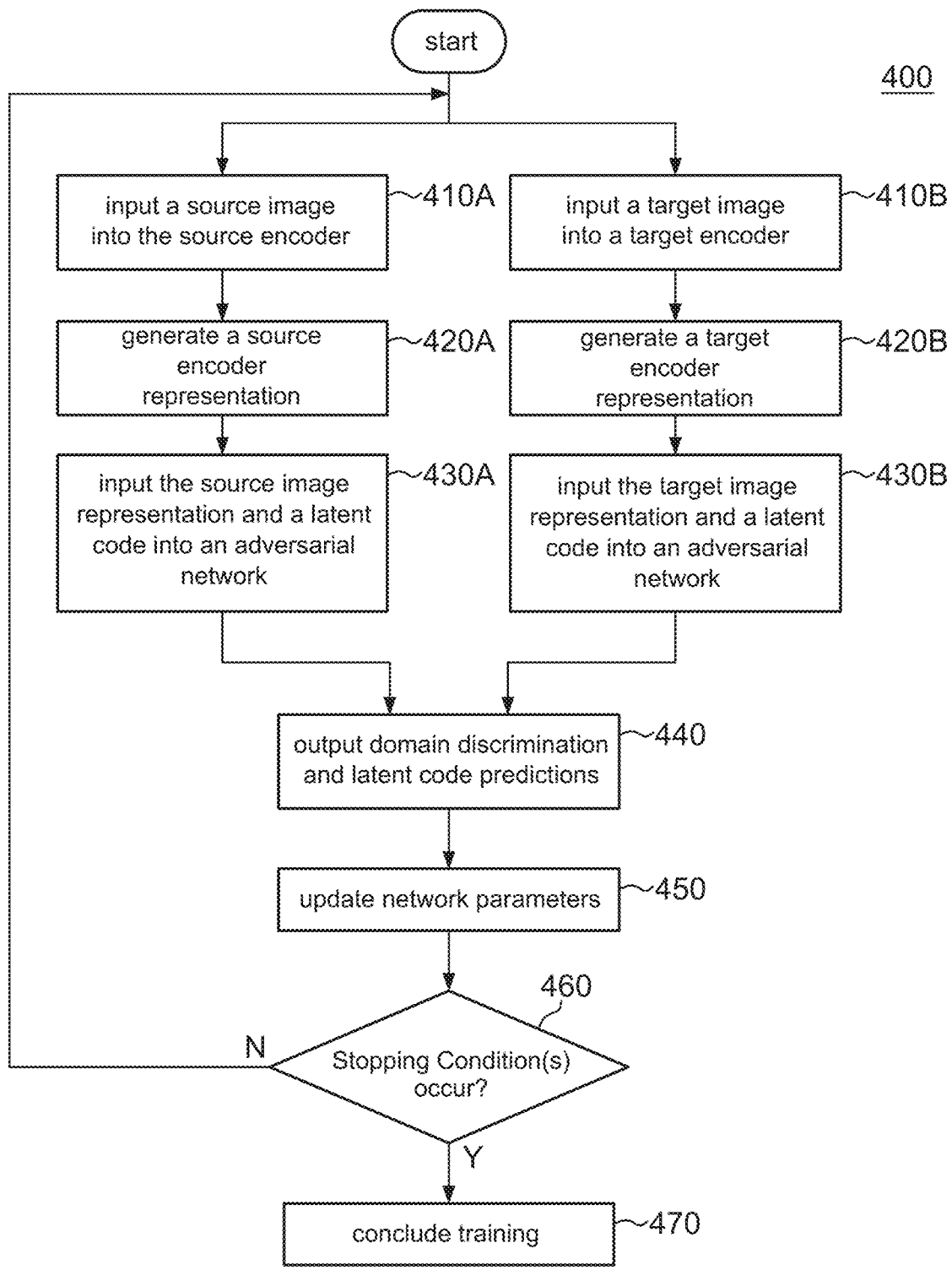
FIG. 4 illustrates a process flow diagram for a second stage of training the LADA network in accordance with a further example.
Figure 5:
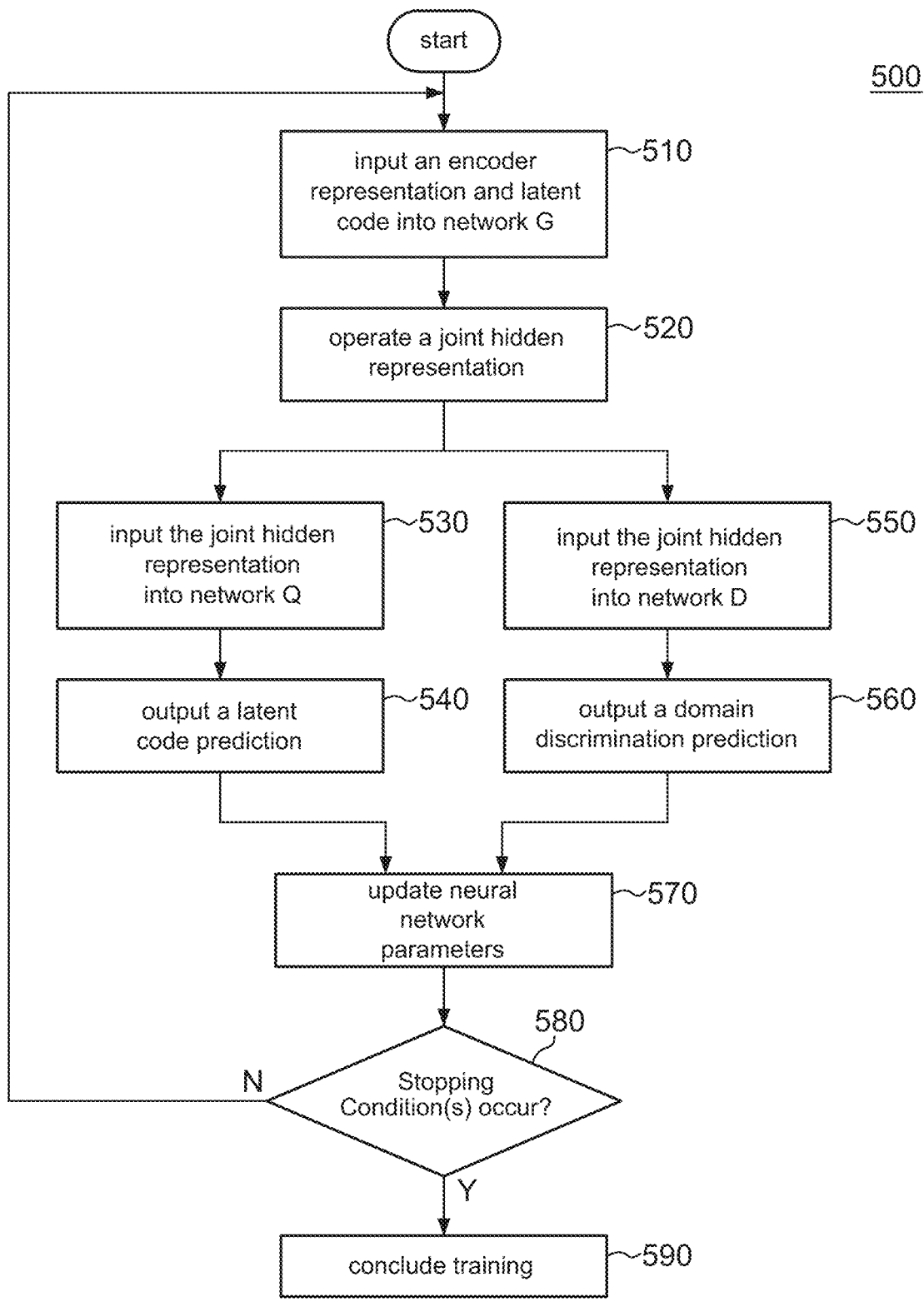
FIG. 5 illustrates a process flow diagram for the second stage of training the LADA network in accordance with a further example.

FIGS. 4 and 5 involve a second training stage for jointly training the encoder and the discriminator. FIGS. 4 and 5 may be performed in parallel for the joint training.

FIG. 4 is a process flow diagram of an example method 400 of a second training stage for training the LADA network of FIG. 2 by one or more processors in accordance with an example. Specifically, in the example illustrated in FIG. 4, the target encoder ($E_t$) is trained by one or more processors for classifying images into one of a plurality of categories using the classifier (C), pre-trained in accordance with the example illustrated by FIG. 3.

At 410A, a source image is input into the pre-trained source encoder ($E_s$). In an example, the source encoder ($E_s$) was pre-trained according to the method described with respect to FIG. 3. The source image is sampled from a labeled set of source images ($X_s$), having source labels ($Y_s$), from the source domain distribution ($p_s(x,y)$). In some examples, the set of source images is the same as the set of source images used during the pre-training stage. In other examples, the set of source images is a different set of source images than the set of source images used during the pre-training stage.

At 420A, the pre-trained source encoder ($E_s$) generates a source encoder representation of the source image input into the pre-trained source encoder ($E_s$). The source encoder representation is output to the adversarial neural network (A). More specifically, as will be discussed with regard to FIG. 5 below, the generated source encoder representation is output to the generator neural network (G).

The target encoder ($E_t$) is configured to receive, as input, a set of unlabeled target images ($X_t$) from the target domain distribution, where the target domain distribution is different from the source domain distribution, as discussed above. Specifically, at 410B, the target encoder ($E_t$) receives a target image.

In some examples, the set of source images ($X_s$) may comprise synthetic images and the set of target images ($X_t$) may comprise real images (e.g. photographs). The synthetic images may be generated, for example, from the real images, respectively. In other examples, the set of source images ($X_s$) and the set of target images ($X_t$) may both comprise real images. For example, the set of source images ($X_s$) and the set of target images ($X_t$) may have different resolutions (e.g. the source images may comprise high-resolution images (having a first resolution) and the target images may comprise low-resolution images (having a second resolution that is lower than the first resolution). Alternatively the set of source images ($X_s$) and the set of target images ($X_t$) may have been taken in different lighting conditions (e.g., the source images may comprise images taken in bright light conditions and the target images may comprise images taken in low light conditions).

The target encoder ($E_t$) is configured to generate, for each input target image, a target encoder representation. Thus, at 420B, the target encoder generates a target encoder representation of the target image. In an example, the target encoder learnable parameters are initialized using the parameters of the pre-trained source encoder. In other words, the initial weights and biases of the target encoder are the same as those of the pre-trained source encoder. Target encoder representations generated by the target encoder ($E_t$) are then output to the adversarial neural network (A).

At 430, the source encoder representation or the target encoder representation combined with latent code (c) is input into the generative adversarial network (A). Specifically, at 430A a combination, $z_s=[E_s(x),c]$, of the source encoder representation generated at 420A and a latent code is input into the generative adversarial network (A) and at 430B a combination, $z_t=[E_t(x),c]$, of the target encoder representation generated at 420B and a latent code is input into the generative adversarial network (A). As will be discussed in more detail with regard to FIG. 5 below, the target encoder representations are input to the generator neural network (G).

The generative adversarial network (A) is configured to output a first prediction (also referred to a domain discrimination prediction) indicating whether an input encoder representation originates from the source domain or the target domain. The generative adversarial network (A) is further configured to output a second prediction of the latent code (also referred to as a latent code prediction). As will be discussed in more detail with regard to FIG. 5 below, the first prediction is computed and output by the discriminator neural network (D) and the second prediction is computed and output by the auxiliary network (Q).

At 440, the generative adversarial network (A) outputs a first prediction indicating whether the source encoder representation input at 430A or whether the target encoder representation input at 430B originates from the source domain or the target domain. In other words, the generative adversarial network (A) predicts whether the input is based on a source encoder representation or a target encoder representation.

Also at 440, the generative adversarial network (A) outputs a second prediction of the latent code (c) for the source encoder representation input at 430A or the target encoder representation input at 430B. In other words, for each input, the generative adversarial network (A) is configured to predict the latent code (c). The second prediction is a probability distribution of the likelihood of latent code (c) given the input encoder representation E(x), the likelihood of the latent code input at 430A or 430B belonging to one of the categories K. Since image labels are not input into the generative adversarial network (and, in any case, are not available for the target images), the loss function is based on the difference between the actual input (the latent code (c)) and the reconstructed input (the second prediction). In other words, the loss function is based on whether the actual input and the reconstructed input are the same or not.

At 450, based on a first loss function associated with an incorrect first prediction and a second loss function associated with an incorrect second prediction, the learnable parameters (i.e. the weight and, optionally, the biases) of the target encoder ($E_t$) and the generative adversarial network (A) are updated by backpropagation.

The target encoder ($E_t$) and the generative adversarial network (A) are trained by one or more processors by repeating 410 through 450 for each of the source images in the set of source images and for each of the target images in the set of target images until one or more predetermined stopping conditions have occurred (e.g., the first loss function and the second loss function have reached a minimum) at 460. Once it is determined at 460 that the first loss function and the second loss function have been minimized, the second training stage is concluded at 470. If at least one of the first and second loss functions have not yet been minimized, control returns to 410 to continue the training based on a new set of source and training images.

As stated above, FIG. 5 involves training of the discriminator. The discriminator may be trained jointly with the encoder.

FIG. 5 is a process flow diagram illustrating in more detail the operation of the generative adversarial network (A) described in FIG. 4 with regard to its component networks (i.e., the generator neural network (G), the domain discriminator neural network (D) and the auxiliary network (Q)), in accordance with an example.

As discussed above with regard to FIG. 4, the inputs to the generative adversarial network (A) are received by the generator neural network (G). More specifically, the generator neural network (G) is configured to receive the source encoder representation combined with latent code as input $z_s=[E_s(x),c]$. The generator neural network is further configured to receive the target encoder representation combined with latent code as input $z_t=[E_t(x),c]$. At 510 shown in FIG. 5 (corresponding to 430A and 430B of FIG. 4), an encoder representation (a source encoder representation or a target encoder representation) combined with latent code (c) is received as input $z=[E(x),c]$ by the generator neural network (G).

The generator neural network (G) is configured to generate a joint hidden representation for each input, z. At 520, the generator neural network (G) computes a joint hidden representation (G(z)) for an input $z=[E(x),c]$. The joint hidden representations computed by the generator neural network (G) are output to the auxiliary neural network (Q) and to the discriminator neural network (D).

The generator network (G) can ignore the latent code (c) by finding a trivial solution satisfying $P_G(x|c)=P_G(x)$. To prevent this, the latent code is made meaningful by maximizing the mutual information, I(c; G(z)), between the latent code and the output, G(z). This mutual information cannot be calculated explicitly, so a lower bound is approximated using standard variational arguments. This includes introducing an auxiliary distribution Q(c|z), which is modeled as a parameterized neural network (the auxiliary neural network Q), in order to approximate the likelihood of the latent code c given the input representation E(x).

In an example, the mutual information $I(c; z_s)$ between the latent codes c and the labeled source images may be increased by using the source labels ($Y_s$) as latent codes.

Training the auxiliary neural network Q on labeled source images enables to encode the semantic meaning of the source labels via the latent code (c) via increasing the mutual information I(c; $z_s$). Simultaneously, the generator G acquires the source label information indirectly by increasing I(c; $z_t$) and learns to utilize the encoded representations of the target images.

In more detail, at 530, the joint hidden representation generated by the generator neural network (G) at 520 is input into the auxiliary neural network (Q). At 540, the auxiliary neural network (Q) outputs a prediction of the latent code (c) for each of the joint hidden representations. Said prediction is the second (latent code) prediction discussed with regard to 440 of FIG. 4 above. Specifically, the auxiliary network (Q) outputs, for the joint hidden representation, a probability distribution for the latent code given the respective joint hidden representation. The auxiliary loss function (the loss function to be minimized when training the auxiliary network (Q)) by one or more processors is given by:

$$\min_{Q} \mathcal{L}^Q = -\mathbb{E}_{c \sim P, x \sim p_d(x)} \log Q(c \mid [E(x), c]) + H(c) \quad (5)$$

In an example, the entropy H(c) is a constant predetermined value and is omitted from the auxiliary loss function $\mathcal{L}^Q$ for simplicity. As discussed above, the latent code (c) is sampled from a distribution $\mathcal{P}$ which may be fixed during the training by one or more processors. If the distribution $\mathcal{P}$ is not fixed, the term H(c) may be differentiable as the regularization term in the auxiliary loss function in equation (5), where the regularization term H(c) smoothes out extreme values of the first (main) term.

At 550, the joint hidden representation generated by the generator neural network at 520 is input into the domain discriminator neural network (D). At 560, the domain discriminator neural network (D) predicts, for each joint hidden representation, whether the joint hidden representation is based on a source encoder representation or a target encoder representation. The prediction is the first (domain discrimination) prediction discussed with regard to 440 of FIG. 4 above.

The target encoder ($E_t$) and the domain discriminator neural networks (D) are trained adversarially by one or more processors. Therefore, during training, an aim may be to maximize the loss function for the domain discriminator neural network (D) and to minimize the loss function for the target encoder ($E_t$). If the domain discriminator neural network (D) is trained using the adversarial loss function ($\mathcal{L}_{adv}$) with inverted labels, the optimization can be split into two independent objectives, one for the domain discriminator neural network (D) and one for the target encoder ($E_t$). In other words, the loss function $\mathcal{L}_{adv}$ may be expressed as the combination of two component loss functions, one associated with the domain discriminator neural network $\mathcal{L}_{adv}^D$ and one associated with the target encoder $\mathcal{L}_{adv}^E$, where $\mathcal{L}_{adv} = \mathcal{L}_{adv}^D + \mathcal{L}_{adv}^E$.

The loss function $\mathcal{L}_{adv}^D$ is given by a combination of the latent codes with the encoded representations of source and target samples as follows:

$$\min_{D} \mathcal{L}_{adv}^D = -\mathbb{E}_{x_s \sim p_s(x), c \sim \mathcal{P}} \log D([E_s(x_s), c])) - \quad (6)$$

$$\mathbb{E}_{x_t \sim p_t(x), c \sim \mathcal{P}} \log(1 - D(G([E_t(x_t), c])))$$

The loss function $\mathcal{L}_{adv}^D$ is as follows:

$$\min_{E_t} \mathcal{L}_{adv}^E = -\mathbb{E}_{x_t \sim p_t(x), c \sim \mathcal{P}} \log D(G([E_t(x_t), c])) \quad (7)$$

At 570, based on the loss functions in equations (5) to (7), the learnable parameters (i.e., the weights and, optionally, the biases) of the target encoder ($E_t$), the domain discriminator neural network (D), the auxiliary neural network (D) and the generator network (G) are updated by backpropagation of the gradients of the loss functions. 570 corresponds to 450 in FIG. 4.

The target encoder ($E_t$), the domain discriminator neural network (D), the auxiliary neural network (D) and the generator network (G) are trained by one or more processors by repeating 510 through 570 for each of the source images in the set of source images and for each of the target images in the set of target images until one or more predetermined stopping conditions have occurred (e.g., each of the loss functions in equations (5) to (7) has reached a minimum). Once it is determined at 580 that the one or more predetermined stopping conditions have occurred, the second training stage is concluded at 590. 580 and 590 correspond to steps 460 and 470 of FIG. 4, respectively.

In an example, the parameters of the pre-trained source encoder are fixed once the first training stage is complete, before training the target encoder and generative adversarial network at the second training stage. This method of training the LADA network may be referred to as two-stage training or LADA-2.

However, in another example, the parameters of the pre-trained source encoder are not fixed once the first training stage is complete and the parameters of the pre-trained source encoder are updated during the second training stage. This method of training the LADA network may be referred to as the three-player training mode or LADA-3.

In the LADA-3 training mode (third/three stage training), the source encoder ($E_s$) and the classifier (C) are trained by one or more processors during a first training stage as described with respect to FIG. 3 above. During the second training stage, as described with respect to FIGS. 4 and 5, the source encoder ($E_s$), the target encoder ($E_t$) and the domain discriminator neural network (D) are trained jointly by one or more processors, by minimizing all the LADA losses given in equations (5) to (7), as will be described in more detail below.

More specifically, after the first training stage, the parameters of the source encoder ($E_t$) are used to initialize the parameters of the target encoder ($E_t$) for the second training stage. At the second training stage, the classification loss function ($\mathcal{L}_{cls}$), the domain adversarial loss function ($\mathcal{L}_{adv}$) and the auxiliary loss function ($\mathcal{L}^Q$) are alternately minimized. Thus, instead of one call for loss minimization on the sum of the three losses $\mathcal{L}_{cls} + \mathcal{L}_{adv}^Q$ at 450 and 570, there are three calls for the minimization of each of the three losses $\mathcal{L}_{cls}$, $\mathcal{L}_{adv}$, $\mathcal{L}^Q$ individually. In other words, for each source image input into the source encoder at 410A and for each target image input into the target encoder at 410B, the classification loss function ($\mathcal{L}_{cls}$), the domain adversarial loss function ($\mathcal{L}_{adv}$) and the auxiliary loss function ($\mathcal{L}^Q$) are each minimized in turn. This allows backpropagation of the gradients of the auxiliary loss function ($\mathcal{L}^Q$) to the source encoder ($E_s$).

The source encoder ($E_s$) may evolve, sometimes at the cost of performing less well on source images, towards a better domain invariant representation and latent code reconstruction in the auxiliary network (Q).

Once the second training stage using LADA-2 or LADA-3 is complete, the target encoder ($E_t$) and the classifier (C), which are then trained, can be used to classify new (test) images.

In some examples, once the latent code construction is learned by the auxiliary neural network (Q), it can be used to predict the target labels. However, Q does not duplicate the source classifier C because it counts on the generative adversarial network to be able to uncover the salient structure of the target domain. Accordingly, in an example (e.g., FIG. 6), the trained target encoder and classifier are used to classify images from that target domain.

Figure 6:
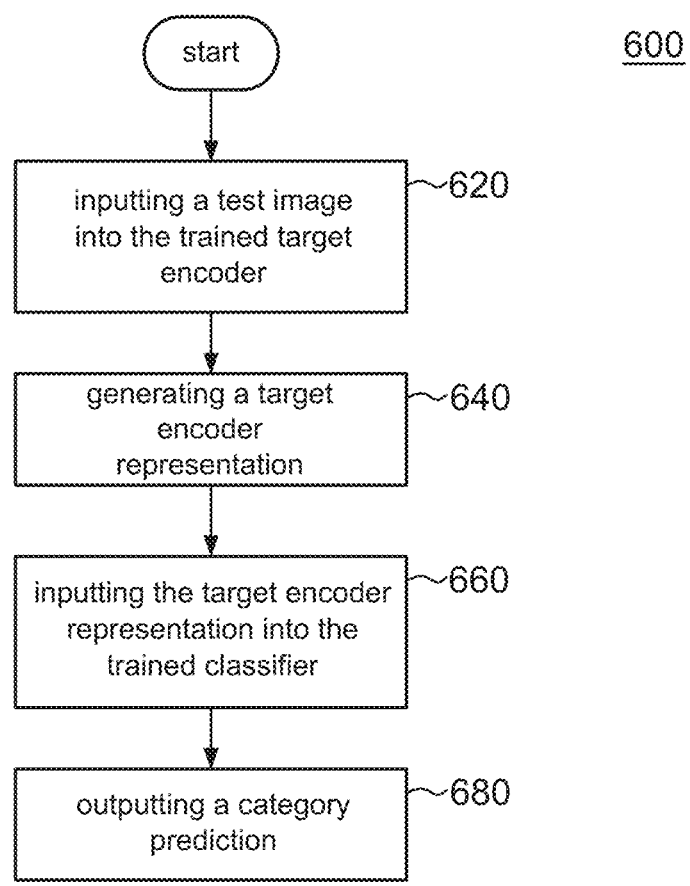
FIG. 6 illustrates a process flow diagram for a method of classifying unlabeled images from a target domain in accordance with a further example.

FIG. 6 illustrates an example method 600 of using the target encoder ($E_t$) and the classifier (C) trained by one or more processors in accordance with the methods described with regard to FIGS. 3 to 5 to classify images from the target domain. At this stage, the target encoder ($E_t$) and the classifier (C) may be referred to as the trained target encoder and the trained classifier, respectively.

At 620, a target image (also referred to as a test image) is input into the trained target encoder. In an example, the target image is an image from the target domain that has not been used during training. At 640, the trained target encoder generates and outputs a target encoder representation of the target image. The target encoder representation of the test image is then input into the trained classifier (660). The trained classifier classifies the target image into one of the plurality of categories and outputs, at 680, a prediction of the category of the test image.

Experimental Implementation Details

The LADA network of FIG. 2 may be implemented using the TensorFlow Library 1.5 with the CUDA toolkit version 9.1. The LADA network is trained by one or more processors on source images ($X_s$) conditioned on their class labels ($Y_s$) and unlabeled target images ($X_t$). Both the source encoder ($E_s$) and the target encoder ($E_t$) include fully connected layers. Domain encoded representations (i.e., the source encoder representation and the target encoder representation) and latent code are mapped to the generator neural network (G), as disclosed above, where the generator neural network (G) includes three hidden layers with a rectified linear unit (ReLU) activation function. In an example, the layer sizes are 256, 128, and 64 neurons, respectively. The output of the generator neural network (G) is then mapped to fully connected layers for the domain discriminator neural network (D) and the auxiliary neural network (Q), having 2 and $N_c$ variables, respectively, where $N_c$ is the number of source classes.

The model may be trained by one or more processors using stochastic gradient descent (Adam optimizer) with mini-batches of size 32 and an initial learning rate of 0.01 at both stages. Dropout with probability of 0.5 may be applied to both domain encoders ($E_s$ and $E_t$) and to the generator neural network (G). This means that, during training, individual nodes of the encoders ($E_s$ and $E_t$) and the generator neural network (G), along with their respective incoming and outgoing connections, are temporarily dropped out of the network with a probability of 0.5, so that a reduced network is left. The classification accuracy on target images is used as the evaluation metric, as will be discussed in more detail below.

Evaluation Protocol

The Kullback-Leibler (KL) divergence may be used to measure the divergence of target class distribution $p_t(y)$ from the source one $p_s(y)$. The class imbalance ratio CI(t,s) is defined as $KL(y_t\|y_s)$. The KL divergence is defined only if, for any class, c, $p_s(y=c)=0$ implies $p_t(y=c)=0$. If $p_t(y=c)$ is zero, the contribution of the c-th term is interpreted as zero because $\lim_{x\to 0+} x\log(x)=0$. Therefore, it can cope with both under-represented and absent target classes, when $p_t(y=c)$ is very low or simply zero. If the source and target classes are well aligned, the CI(t,s) values are close to zero.

The severe class imbalance is modeled by a controlled sampling from the target collection. A Random CI sampling protocol may be used. Specifically, a KL divergence generator is run and target subsets sampled in such a way that CI(t,s) values follow a uniform distribution, CI(t,s)~Unif(0, 1). By varying CI values in the (0,1) range, a better idea of how unsupervised domain adaptation methods resist to the class imbalance is obtained.

Experimental Evaluation

The performance of the LADA network disclosed above under the class imbalance is evaluated below.

Evaluation Options

The baseline may be to disregard the latent codes in the LADA network by setting all latent codes to 0. This network is denoted LADA-0.

The first training option concerns the distribution $\mathcal{P}$ for sampling latent codes c. Due to the semi-supervised latent codes in the auxiliary neural network (Q), the coupled sampling may be used for the source encoder ($E_s$) i.e., when sampling the source domain as input to the generator neural network (G), $x\sim p_s(x), c\sim \mathcal{P}$, the encoded representation $E_s(x)$ of source instance x is coupled with the latent code c which is the corresponding labels $y_s$.

Concerning the distribution $\mathcal{P}$ for latent codes c, three options are distinguished:

LADA-U applies the uniform discrete distribution for latent codes, $c\sim\text{Unif}(N_c)$;

LADA-S samples latent code c from the known source class distribution, $c\sim p_s(y)$; and LADA-T combines the classifier (C) and auxiliary neural network (Q) to estimate the target class distribution $\hat{p}_t(y)$. As entropy H(c) is assumed to be constant in equation (7), the network with the uniform discrete distribution $c\sim\text{Unif}(N_c)$ is trained first; then the target class distribution $\hat{p}_t(y)$ is estimated and fixed and latent codes, $c\sim\hat{p}_t(y)$, are sampled from it.

The second training option is on the second stage of LADA training. Along with the two-stage training (LADA-2), the three-player mode (LADA-3) is also considered, which allows back propagate of the auxiliary loss to the source encoder and better learning of domain invariant representations.

To estimate the target class distributions, class probabilities for target images, $p^C(y|x_t)$, predicted by classifier C can be complemented with the $p^Q(y|x_t)$ by the auxiliary network Q, as the labels are used as the latent codes. The two predictions are then summed (added). The product rule, used in the class imbalance case (where some classes have very low probabilities), $p(y|x)=p^C(y|x)p^Q(y|x)/p(y)$, may not work as favoring rare and absent classes.

Datasets

Figure 7:
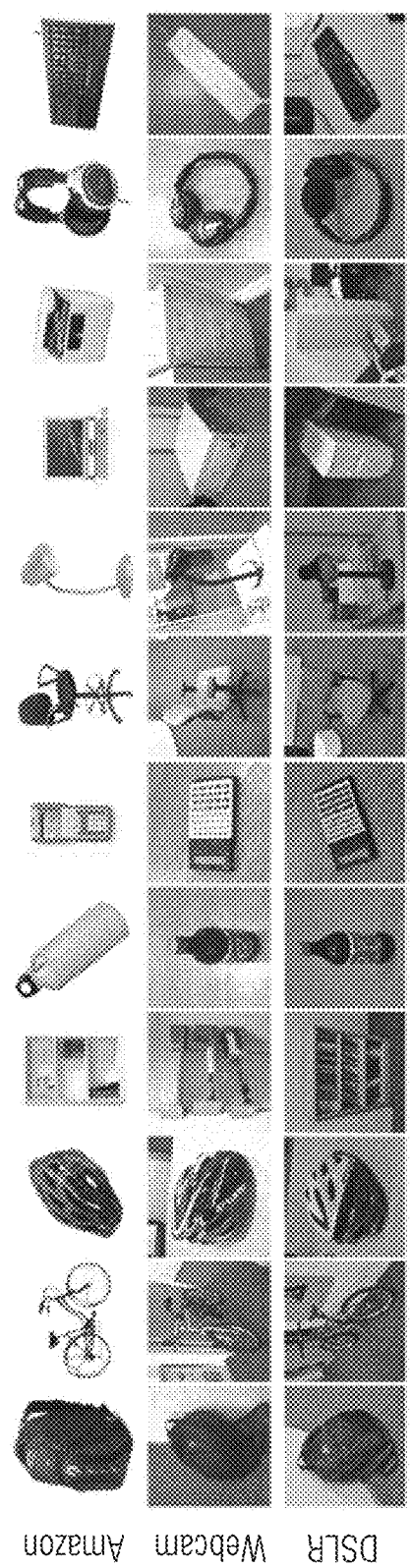
FIG. 7 illustrates the Office 31 dataset.
Figure 8:
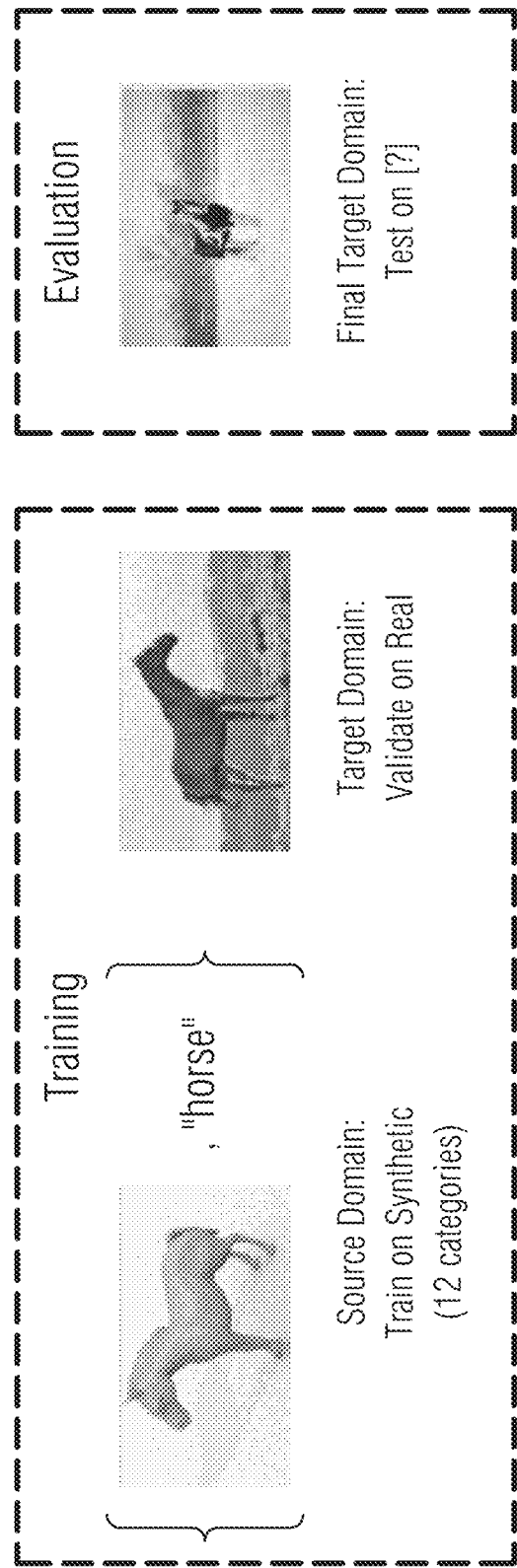
FIG. 8 illustrates the VisDA dataset.

Experiments were performed on two image benchmark datasets Office31 (OFF31), shown in FIG. 7, and VisDA, shown in FIG. 8.

Office31 is a dataset for comparing visual domain adaptation methods. It includes 4652 images from three domains, Amazon, DSLR and Webcam, with 31 classes in each domain. All domains in the collection are well-aligned.

VisDA is a dataset has a focus on the simulation-to-reality shift. In the image classification task, a goal is to first train a model on simulated, synthetic data in the source domain and then adapt it to perform well on real image data in the unlabeled test domain. The VisDA dataset includes over 280K source and 55K target images across 12 categories. ResNet-50 models are pre-trained on the ImageNet collection and then fine-tuned on a smaller image collection using 2084 deep convolutional activation features as image representations.

Evaluation Results

Figure 9:
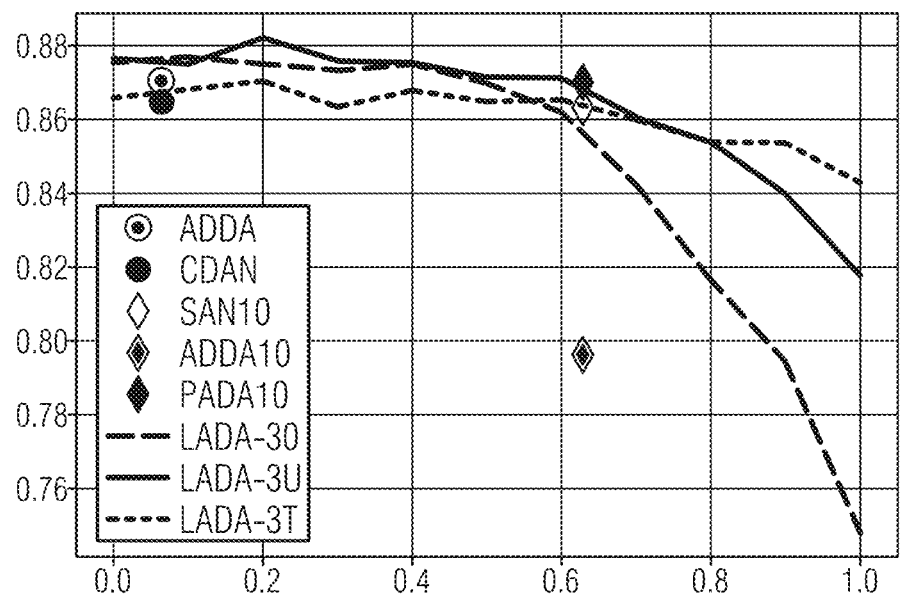
FIG. 9 is a plot of classification accuracy as a function of KL divergence for Office-31 domain adaptation tasks.

The classification accuracy for the six Office31 domain adaptation tasks was computed. For each task, the average over 50 runs was taken with the uniformly distributed CI values, when training LADA-3O, LADA-3U and LADA-3T models. Accuracy curves for the six domain adaptation tasks were averaged and are shown in FIG. 9. All three LADA versions perform similarly when CI values are inferior to 0.5. Their performance is comparable to the state of the art methods. In the class alignment case, they are compared to ADDA and Conditional Domain Adversarial Network (CDAN). In the partial domain adaptation case, they are compared to the weighted ADDA (ADDA10), Selective Adversarial Networks (SAN10) and Partial Adversarial Domain Adaptation (PADA10). When the CI values are close to 0.6, LADA-U and LADA-T behave on average as good or better than methods specifically developed for the partial domain adaptation. The LADA methods however make no assumption on the absence of some classes; they treat equally cases when the classes are under-represented or absent.

For all methods, performance starts decreasing when the CI values approach 1. LADA-3U and LADA-3T resist better to the class imbalance than the baseline LADA-3O. LADA-T limits the target accuracy drop to 5-7%. It behaves particularly well when CI is close to 1. Surprisingly, it shows a slightly worse performance for low CI values, compared to the other two models.

Figure 10:
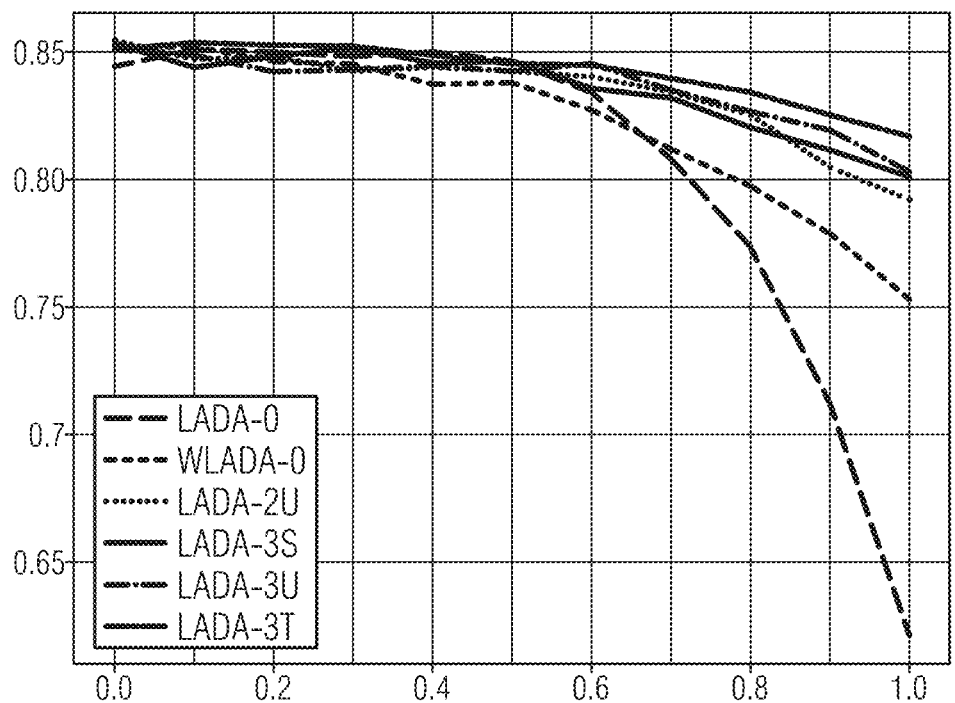
FIG. 10 is a plot of classification accuracy as a function of KL divergence for the VisDA dataset.

FIG. 10 illustrates the classification accuracy for the VisDa dataset. The VisDA dataset is used to perform an ablation study and investigate the different options of LADA training. The evaluation results are shown in FIG. 10. LADA-3 to LADA-2 and the baseline are compared. As FIG. 10 shows, LADA-0 does not resist to the severe class imbalance. The difference between LADA-2 and LADA-3 is small but statistically significant. Specifically, LADA-2 does not change the parameters of the source encoder while LADA-3 allows some small modifications. Thus, the three-player training allows to maintain a target accuracy, at the price of performing slightly worse on source samples. By optimizing the source encoder at the second stage, the classifier can benefit from the disentangling of the target domain with the auxiliary network (Q). In other words, in LADA-3, improvement in the target domain (which may be more important) can be obtained for the price of slightly worse performance in the source domain (which is less important because, without the domain adaptation task, the good original source encoder trained in the first training stage is always available).

Figure 11:
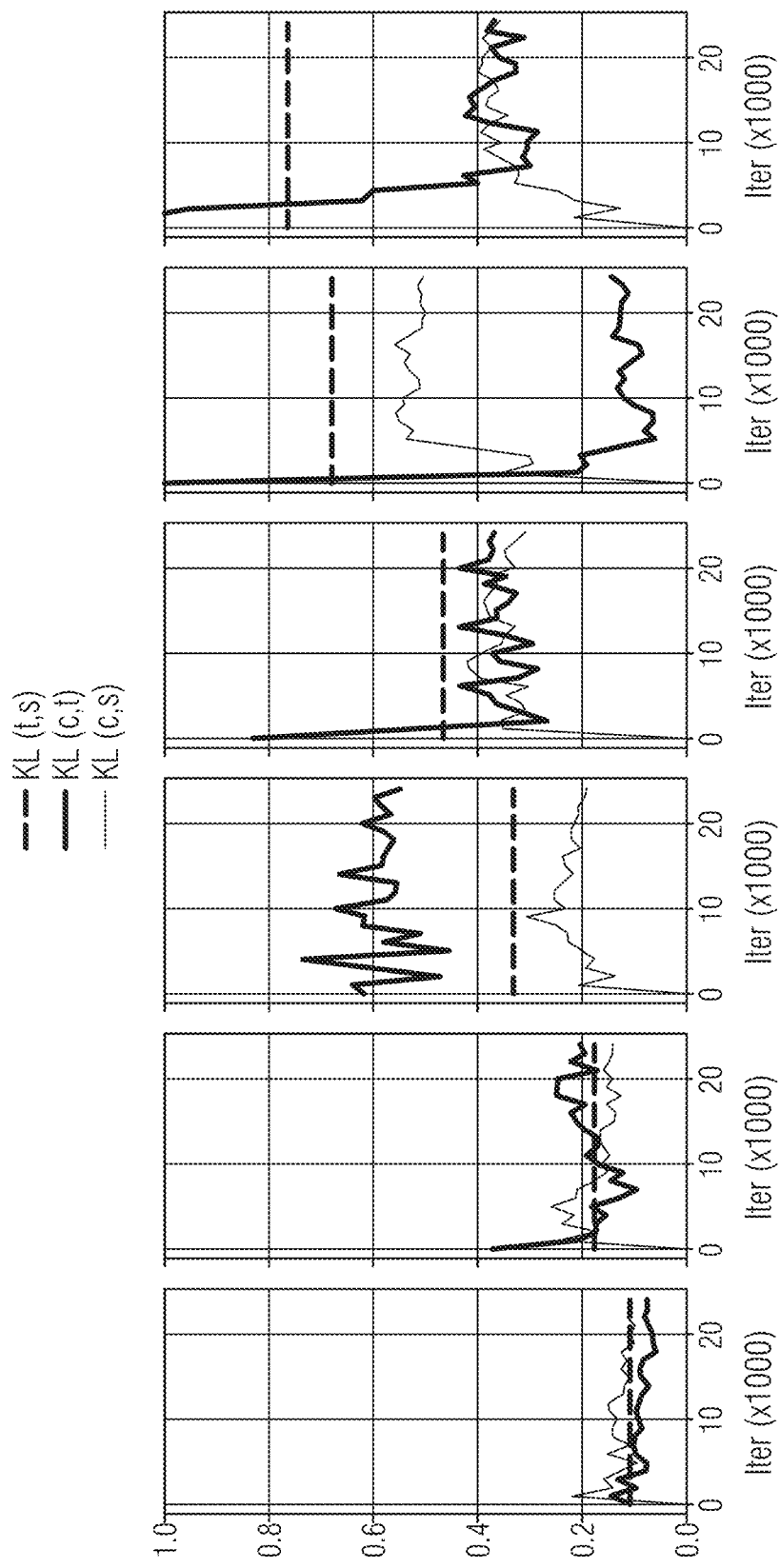
FIG. 11 is a plot of KL divergence between the true and the estimated target class distributions as a function of a number of iterations, for different CI values.

FIG. 11 illustrates the KL divergence between the true and estimated target class distributions for different CI values. Here, how well the LADA models are at estimating the (unknown) target class distribution is studied. Given an initial CI value, LADA-U is trained and how the target class estimation $\hat{p}_t(y)$ diverges from the true target class distribution $p_t(y)$ is measured. The KL divergence is used to measure it, $KL(\hat{p}_t(y)\|p_t(y))$ (thick solid line). The divergence of $\hat{p}_t(y)$ from the source distribution $p_s(Y)$ (thin solid line) is also tracked.

FIG. 11 reports LADA-U performance on the class imbalance reduction, with the starting CI values growing from 0.1 to 0.9 (dashed line). It is able to reduce the divergence between $\hat{p}_t(y)$ and $p_t(y)$ in most cases. However, there may be an incompressible divergence that the models may find difficult to break up.

While some specific embodiments have been described in detail above, it will be apparent to those skilled in the art that various modifications, variations and improvements of the embodiments may be made in the light of the above teachings and within the content of the appended claims without departing from the intended scope of the embodiments. In addition, those areas in which it is believed that those of ordinary skill in the art are familiar have not been described herein in order not to unnecessarily obscure the embodiments described herein. Accordingly, it is to be understood that the embodiments are not to be limited by the specific illustrative embodiments, but only by the scope of the appended claims.

Although the above embodiments have been described in the context of method steps, they also represent a description of a corresponding component, module or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an example, a storage medium (or a data carrier, or a computer-readable medium) comprises, stored thereon, the computer program or the computer-executable instructions for performing one of the methods described herein when it is performed by a processor. In a further example, an apparatus comprises one or more processors and the storage medium mentioned above.

In a further example, an apparatus comprises, for example, processing circuitry, e.g., a processor communicating with a memory, configured to, or adapted to, perform one of the methods described herein.

A further example comprises a computer having installed thereon the computer program or instructions for performing one of the methods described herein.

Figure 12:
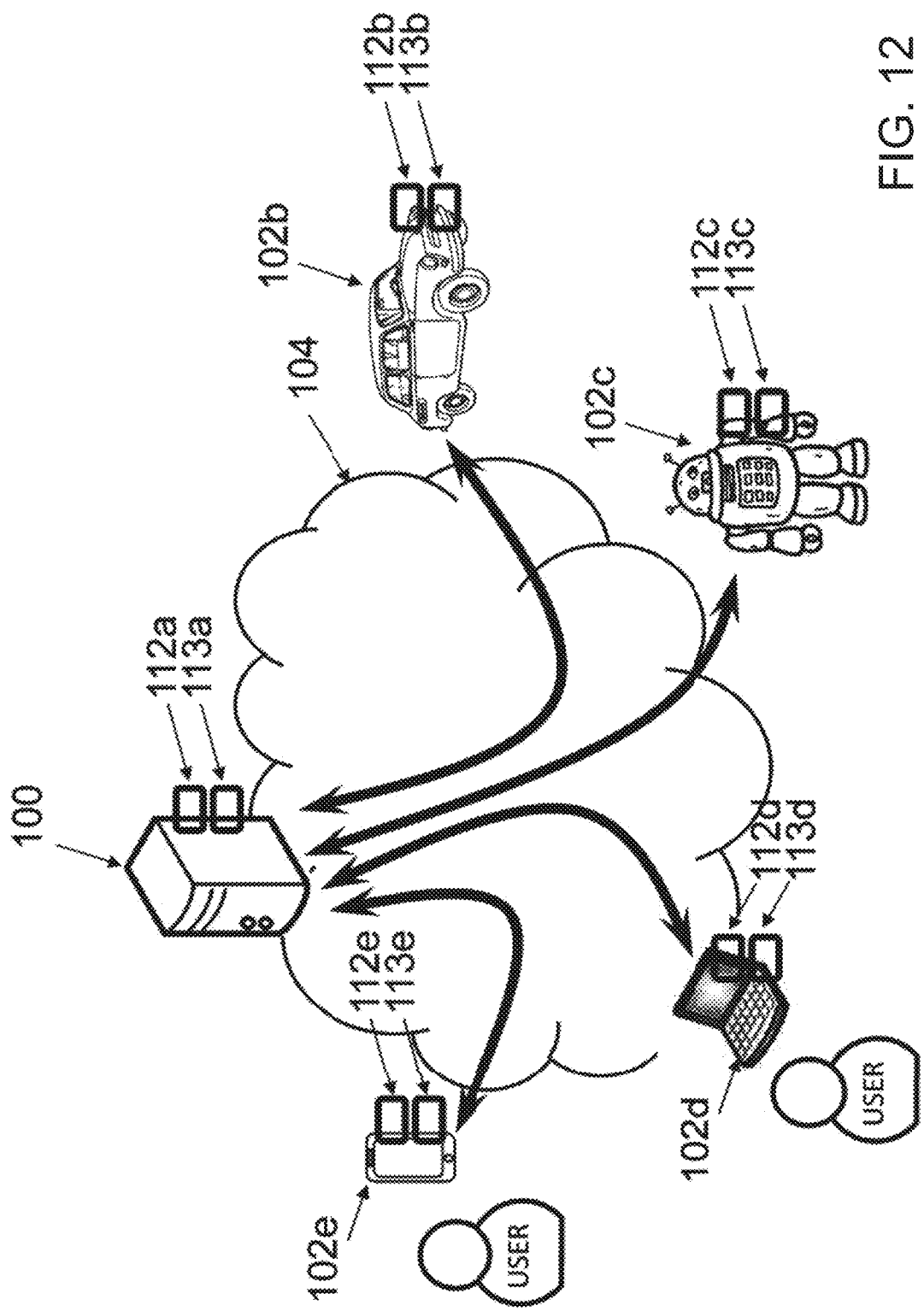
FIG. 12 illustrates an example of architecture in which the disclosed methods may be performed.

The above-mentioned methods and examples may be implemented within an architecture such as illustrated in FIG. 12, which comprises server 100 and one or more client devices 102 that communicate over a network 104 (which may be wireless and/or wired) such as the Internet for data exchange. Server 100 and the client devices 102 include a data processor 112 and memory 113 such as a hard disk. The client devices 102 may be any device that communicates with server 100, including autonomous vehicle 102*b*, robot 102*c*, computer 102*d*, or cell phone 102*e*.

More precisely in an example, the training and classifying methods according to the examples of FIGS. 3 to 6 may be performed at server 100. In other examples, the training and classifying methods according to the examples of FIGS. 3 to 6 may be performed at client device 102. In yet other examples, the training and classifying methods may be performed at a different server or on a plurality of servers in a distributed manner.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions above and below, the term "module" or the term "controller" may replace the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method of training a target encoder for classifying images into one of a plurality of categories using a classifier trained on images from a source domain, the method comprising:
generating, by a pre-trained source encoder, a source encoder representation for each image of a labeled set of source images from the source domain;
generating by the target encoder, a target encoder representation for each image of an unlabeled set of target images from a target domain;
inputting, into a generative adversarial network, the source encoder representations, the target encoder representations, and latent code representing the plurality of categories;
by the generative adversarial network, outputting a first prediction indicating whether each of the source encoder representations and each of the target encoder representations originate from the source domain or the target domain;
by the generative adversarial network, outputting a second prediction of the latent code for each of the source encoder representations and each of the target encoder representations; and
training the target encoder and the generative adversarial network by repeatedly updating parameters of the target encoder and the generative adversarial network until one or more predetermined stopping conditions occur.

2. The method of claim 1, wherein the training includes training the target encoder and the generative adversarial network by repeatedly updating parameters of the target encoder and the generative adversarial network until a first loss function for the first prediction reaches a minimum value and a second loss function for the second prediction reaches a minimum value.

3. The method claim 1, further comprising:
classifying a target image using the trained target encoder and the classifier, wherein the classifier is trained using supervised learning on the labeled set of source images.

4. The method of claim 3, wherein classifying a target image using the trained target encoder and the classifier, comprises:
inputting a target image into the trained target encoder;
generating a target encoder representation of the target image;
inputting the target encoder representation of the target image into the trained classifier; and
classifying the target image by the trained classifier into one of the plurality of categories.

5. The method of claim 1, further comprising pre-training the source encoder and the classifier by:
inputting the source encoder representations and source labels into the classifier; and
pre-training the source encoder and the classifier by repeatedly updating parameters of the source encoder and the classifier until one or more second predetermined stopping conditions occur.

6. The method of claim 5, wherein the pre-training includes pre-training the source encoder and the classifier by repeatedly updating parameters of the source encoder and the classifier until a classification loss function reaches a minimum value.

7. The method of claim 5, wherein the parameters of the pre-trained source encoder are not fixed after the pre-training, and
wherein the method further comprises training the pre-trained source encoder jointly with the target encoder and the generative adversarial network by repeatedly updating parameters of the source encoder, the target encoder, and the generative adversarial network (A) until a classification loss function reaches a minimum value, a first loss function for the first prediction reaches a minimum value and a second loss function for the second prediction reaches a minimum value.

8. The method of claim 5, wherein the parameters of the pre-trained source encoder are fixed after the pre-training.

9. The method of claim 1, wherein the parameters of the pre-trained source encoder are fixed after the pre-training.

10. The method of claim 1, wherein the parameters of the target encoder are initialized using parameters of the pre-trained source encoder.

11. The method of claim 1, wherein the generative adversarial network comprises a generator neural network, a discriminator neural network, and an auxiliary neural network, and
wherein the inputting, into the generative adversarial network, the source encoder representations, the target encoder representations, and the latent code comprises inputting, into the generator neural network, the source encoder representations combined with the latent code and the target encoder representations combined with the latent code.

12. The method of claim 11, further comprising:
computing, by the generator neural network, joint hidden representations for each of the source encoder representations and each of the target encoder representations, each joint hidden representation based on a combination of the latent code and a respective one of the source encoder representations and the target encoder representations;
inputting, into the discriminator neural network, the joint hidden representations, wherein the discriminator neural network is configured to output the first prediction; and
inputting, into the auxiliary neural network, the joint hidden representations, wherein the auxiliary neural network is configured to output the second prediction.

13. The method of claim 12 wherein outputting, by the auxiliary neural network, the second prediction of the latent code for each of the joint hidden representations comprises outputting a probability distribution for the latent code given the respective joint representation.

14. The method of claim 13, wherein the auxiliary neural network includes a convolutional neural network comprising a final fully connected layer and a softmax function to output parameters for the probability distribution.

15. The method of claim 11, wherein the generator neural network includes a convolutional neural network comprising three hidden layers with rectified linear unit (ReLu) activation.

16. The method of claim 11, wherein the discriminator neural network includes a convolutional neural network comprising at least one fully connected layer.

17. A non-transitory computer-readable storage medium having computer-executable instructions stored thereon, which, when executed by one or more processors perform a method of training a target encoder for classifying images into one of a plurality of categories using a classifier trained on images from a source domain, the method comprising:
generating, by a pre-trained source encoder, a source encoder representation for each image of a labeled set of source images from the source domain;
generating, by the target encoder, a target encoder representation for each image of an unlabeled set of target images from a target domain;
inputting, into a generative adversarial network, the source encoder representations, the target encoder representations, and latent code representing the plurality of categories,
wherein the generative adversarial network is configured to:
output a first prediction indicating whether each of the source encoder representations and each of the target encoder representations originate from the source domain or the target domain; and
output a second prediction of the latent code for each of the source encoder representations and each of the target encoder representations; and
training the target encoder and the generative adversarial network by repeatedly updating parameters of the target encoder and the generative adversarial network until one or more predetermined stopping conditions occur.

18. A training system comprising:
a target encoder configured to classify images into one of a plurality of categories using a classifier;
a pre-trained source encoder configured to generate a source encoder representation for each image of a labeled set of source images from a source domain,
wherein the target encoder is configured to generate a target encoder representation for each image of an unlabeled set of target images from a target domain;
a generative adversarial network configured to:
receive the source encoder representations, the target encoder representations, and latent code representing the plurality of categories;
output a first prediction indicating whether each of the source encoder representations and each of the target encoder representations originate from the source domain or the target domain;
output a second prediction of the latent code for each of the source encoder representations and each of the target encoder representations; and
one or more processors configured to train the target encoder and the generative adversarial network by repeatedly updating parameters of the target encoder and the generative adversarial network until one or more predetermined stopping conditions occur.

19. The training system of claim 18 wherein the one or more processors are configured to train the target encoder and the generative adversarial network by repeatedly updating parameters of the target encoder and the generative adversarial network until a first loss function for the first prediction reaches a minimum value and a second loss function for the second prediction reaches a minimum value.

20. The training system of claim 18 wherein the generative adversarial network comprises a generator neural network, a discriminator neural network, and an auxiliary neural network.

21. The training system of claim 20 wherein:
the generator neural network is configured to generate joint hidden representations for each of the source encoder representations and each of the target encoder representations, each joint hidden representation generated based on a combination of the latent code and a respective one of the source encoder representations and the target encoder representations;
the discriminator neural network is configured to generate the first prediction based on the joint hidden representations; and
the auxiliary neural network is configured to output the second prediction based on the joint hidden representations.

22. The training system of claim 21, wherein the auxiliary neural network is configured to output the second prediction including a probability distribution for the latent code given the respective joint representation.

23. The training system of claim 22, wherein:
the auxiliary neural network includes a convolutional neural network comprising a final fully connected layer and a softmax function to output parameters for the probability distribution;
the generator neural network includes a convolutional neural network comprising three hidden layers with rectified linear unit (ReLu) activation; and
the discriminator neural network includes a convolutional neural network comprising at least one fully connected layer.

* * * * *